(12) United States Patent
Sumi et al.

(10) Patent No.: US 9,341,859 B2
(45) Date of Patent: May 17, 2016

(54) 3D IMAGE BASED ALIGNMENT METHOD

(75) Inventors: Naoki Sumi, Chu-Nan (TW); Satoru Takahashi, Chu-Nan (TW)

(73) Assignees: INNOLUX CORPORATION, Jhu-Nan (TW); INNOCOM TECHNOLOGY (SHENZHEN) CO., LTD., Shenzhen (CN)

( * ) Notice: Subject to any disclaimer, the term of this patent is extended or adjusted under 35 U.S.C. 154(b) by 878 days.

(21) Appl. No.: 13/543,356

(22) Filed: Jul. 6, 2012

(65) Prior Publication Data

US 2014/0009579 A1    Jan. 9, 2014

(51) Int. Cl.
| | | |
|---|---|---|
| G01B 11/25 | (2006.01) | |
| G01B 11/255 | (2006.01) | |
| G02B 27/60 | (2006.01) | |
| H04N 13/04 | (2006.01) | |
| G02B 27/22 | (2006.01) | |

(52) U.S. Cl.
CPC ............ *G02B 27/60* (2013.01); *H04N 13/0409* (2013.01); *H04N 13/0425* (2013.01); *G02B 27/2214* (2013.01)

(58) Field of Classification Search
CPC ............. G02B 27/2214; G02B 27/225; H04N 13/0404; H04N 13/0409; H04N 13/0415
See application file for complete search history.

(56) References Cited

U.S. PATENT DOCUMENTS

| 5,479,270 A * | 12/1995 | Taylor ................... G03B 35/24 355/22 |
| 2009/0148032 A1* | 6/2009 | Schumaker ........... G06T 7/0028 382/141 |
| 2010/0053617 A1* | 3/2010 | Mori ................... G02B 27/2214 356/401 |
| 2012/0105954 A1* | 5/2012 | Prouty, IV ......... G02B 27/2214 359/462 |
| 2012/0113100 A1* | 5/2012 | Niioka ............... G02B 27/2214 345/419 |
| 2014/0036047 A1* | 2/2014 | Watanabe .......... G02B 27/2214 348/54 |

FOREIGN PATENT DOCUMENTS

| CN | 101710202 | 5/2010 |
| JP | 2010-019987 | 1/2010 |

OTHER PUBLICATIONS

Gabrielyan, Emin. "The basics of line moiré patterns and optical speedup."arXiv preprint physics/0703098 (2007).*
Li, Nianhua, Wei Wu, and Stephen Y. Chou. "Sub-20-nm alignment in nanoimprint lithography using Moire fringe." Nano letters 6.11 (2006): 2626-2629.*
Foreign Office Action issued by the State Intellectual Property Office of the People's Republic of China, dated Mar. 20, 2015.

* cited by examiner

*Primary Examiner* — Sath V Perungavoor
*Assistant Examiner* — Clifford Hilaire
(74) *Attorney, Agent, or Firm* — Liu & Liu

(57) ABSTRACT

An alignment method applied to a barrier-type 3D display includes providing a 3D alignment device at least comprising an image capture tool and an alignment shift analysis software; disposing a display panel with a barrier laminated thereon in the 3D alignment device; presenting a display and a barrier alignment check patterns on the display panel and the barrier; the image capture tool capturing an image of a moiré pattern generated by the display and the barrier alignment check patterns; analyzing the image of the moiré pattern by the alignment shift analysis software, and determining at least three measurement points of the image of the moiré pattern; calculating position shift for each measurement point and rotation angle between display panel and barrier by the alignment shift analysis software; and adjusting corresponding position between display panel and barrier if the calculation results exceed predetermined alignment errors.

21 Claims, 25 Drawing Sheets

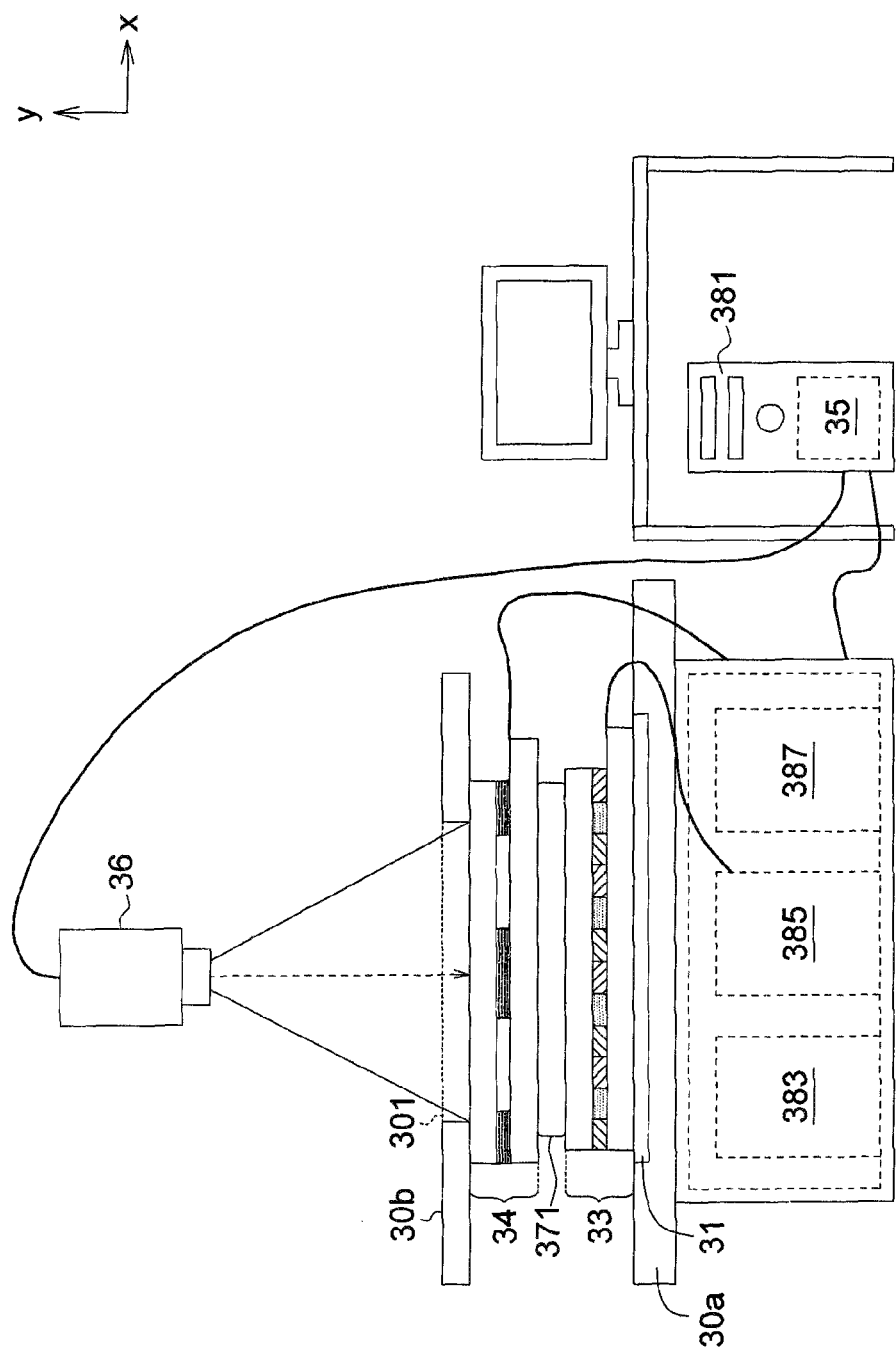

3D IMAGE BASED ALIGNMENT METHOD

BACKGROUND

1. Technical Field

The disclosed embodiments relate in general to a 3D image based alignment method, and more particularly to an alignment method applied to the barrier-type 3D display, for accurately aligning a barrier and a display panel of the 3D display.

2. Description of the Related Art

Autostereoscopic displays, also known as "Naked eye 3D display", are able to provide binocular depth perception without the hindrance of specialized headgear or filter/shutter glasses.

Naked eye 3D displays have been demonstrated using a range of optical elements in combination with an LCD including parallax barrier technology and lenticular optic technology to provide stereoscopic vision. Generally, the parallax barrier has optical apertures aligned with columns of LCD pixels, and the lenticular optics has cylindrical lenses aligned with columns of LCD pixels. A parallax barrier could be a sheet with a particular fine trip pattern, or an electro optic panel with fine and vertical stripes (i.e. a display module), alternatively. The parallax barrier is placed at a regular spacing, in front or rear of a colored LCD.

FIG. 1 is a conventional 3D display with parallax barrier in front of display panel. The 3D display 1 includes a backlight system 11, a display panel 13 on the backlight system 11, a parallax barrier 15 above the display panel 13, the polarizers 16a and 16b respectively on two sides of the display panel 13. The parallax barrier 15 having fine opaque stripes separates the light pathway of spatial images into images for left eye and right eye to perceive 3D images. Users can see the left eye image/right eye image while the opaque stripes would block the right eye/left eye in the three-dimensional display mode. If an electro optic panel with fine and vertical stripes (i.e. a display module) is adopted as the parallax barrier 15, the 3D display 1 of FIG. 1 is a 2D/3D switchable display, and the display is in 2D mode when the barrier panel is turned off. Further, a touch sensor could be further integrated into the 3D display 1 by coupling a sensing electrode (not shown) on the parallax barrier 15, to making a 3D display with touch screen.

FIG. 2A-FIG. 2G illustrate a conventional lamination and alignment process of a 3D LCD display. As shown in FIG. 2A, a LCD panel 23 and a 3D barrier module 25 are loaded on a display stage 20a and a barrier stage 20b, respectively. The LCD panel 23 is disposed on a back light 21, and the 3D barrier module 25 is disposed on a clear window 201 of the barrier stage 20b. As shown in FIG. 2B, the camera 26 captures the images of alignment marks respectively on the LCD panel 23 and the 3D barrier module 25, and position of the LCD panel 23 might be adjusted by shifting the display stage 20a according to the image results for pre-aligning the LCD panel 23 and the 3D barrier module 25 positions. An injector 27 drops an UV glue 271 on the 3D barrier module 25, as shown in FIG. 2C. The 3D barrier module 25 is then laminated on the LCD panel 23, as shown in FIG. 2D. Next, a 3D image based alignment is executed by capturing images of 3D screen, as shown in FIG. 2E. Then, as shown in FIG. 2F, the lamination is exposed under an UV light source 29 for curing the UV glue 271, thereby fixing the LCD panel 23 and the 3D barrier module 25 to form a 3D display module. Finally, the barrier stage 20b is unplugged and the 3D display module is ready to be unloaded from the display stage 20a, as shown in FIG. 2G.

No matter what 3D component (i.e. parallax barrier/lenses) is used, the lamination machine of the 3D component and the display panel requires high accuracy and high throughput.

SUMMARY

The disclosure is directed to a 3D image based alignment method, particularly applied to a barrier-type 3D display, for proceeding accurate alignment between a 3D component (barrier) and a display panel of the 3D display. The applications of the disclosure are varied from the two-view 3D displays to the multi-view 3D displays. Also, the algorithm as described in the embodiments has proven that the method of the disclosure is accurate for the alignment between the display panel and the 3D component.

According to one embodiment, an alignment method applied to a barrier-type 3D display is provided, comprising steps of:

providing a 3D alignment device at least comprising an image capture tool and an alignment shift analysis software coupled to the image capture tool;

disposing a display panel with a barrier laminated thereon in the 3D alignment device, and the image capture tool positioned above the barrier;

presenting a display alignment check pattern on the display panel and a barrier alignment check pattern on the barrier;

the image capture tool capturing an image of a moiré pattern generated by the display alignment check pattern and the barrier alignment check pattern;

analyzing the image of the moiré pattern by the alignment shift analysis software, and determining at least three measurement points correspondingly at an upper virtual line and an lower virtual line of the image of the moiré pattern;

calculating a position shift for each of the measurement points by the alignment shift analysis software;

calculating a rotation angle (at a x-y plane) between the display panel and the barrier from position shift calculation results of the measurement points; and adjusting corresponding position between the display panel and the barrier if the position shift results of the measurement points and the rotation angle exceed an predetermined alignment error.

BRIEF DESCRIPTION OF THE DRAWINGS

FIG. 3 illustrates a 3D alignment device according to one of the embodiment of the present disclosure.

Figure 1:
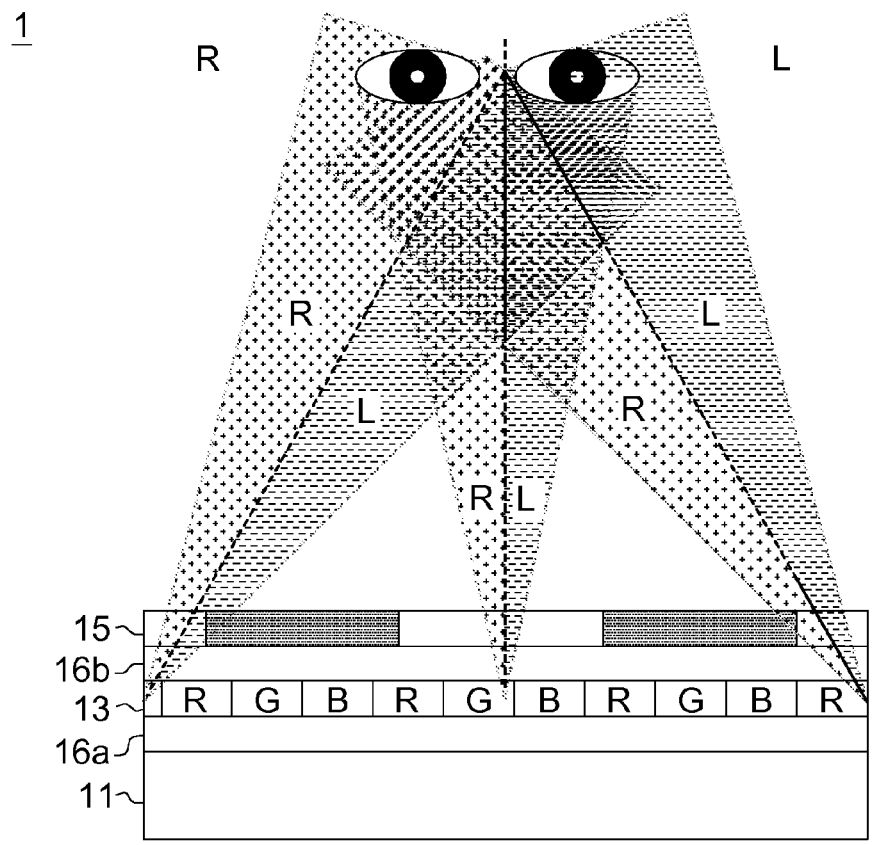
FIG. 1 (prior art) is a conventional 3D display with parallax barrier in front of display panel.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The 3D image based alignment methods applied to the barrier-type 3D display without directly forming the alignment marks on the barrier and the display panel of the 3D display are provided to demonstrate, but not intended to limit the method of the present disclosure. The 3D image based alignment methods of the disclosure also include the methods conducted by directly forming the special 3D alignment check patterns on the barrier and the display panel. The modifications and variations can be made without departing from the spirit of the disclosure to meet the requirements of the practical applications. In the following disclosure, Embodiments 1, 3, 5, 6, 8 and 9 demonstrate the alignment methods conducted by showing images of the 3D alignment check patterns on the barrier and the display panel, while Embodiments 2, 4, 7 demonstrate the alignment methods conducted by directly forming the 3D alignment check pattern on the barrier and the display panel.

<3D Alignment Device>

Figure 2A:
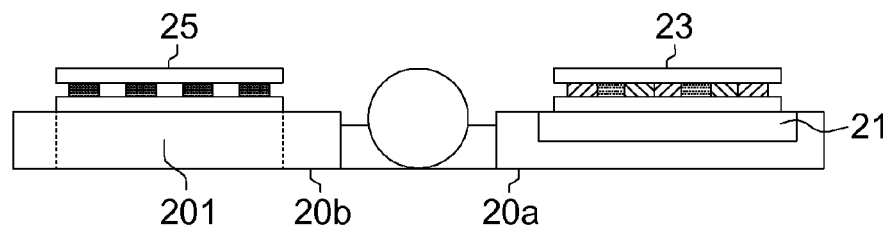
FIG. 2A-FIG. 2G (prior art) illustrate a conventional lamination and alignment process of a 3D LCD display.
Figure 2B:
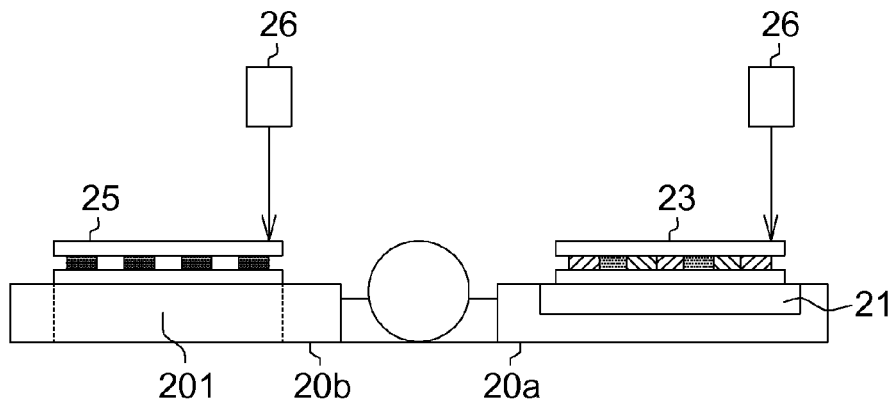
Figure 2C:
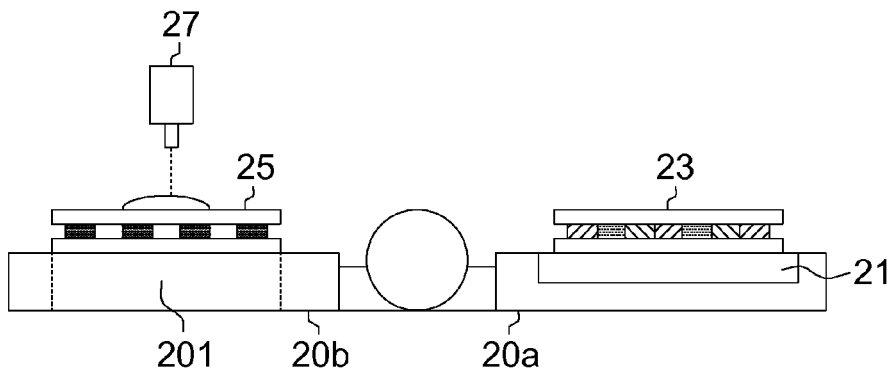
Figure 2D:
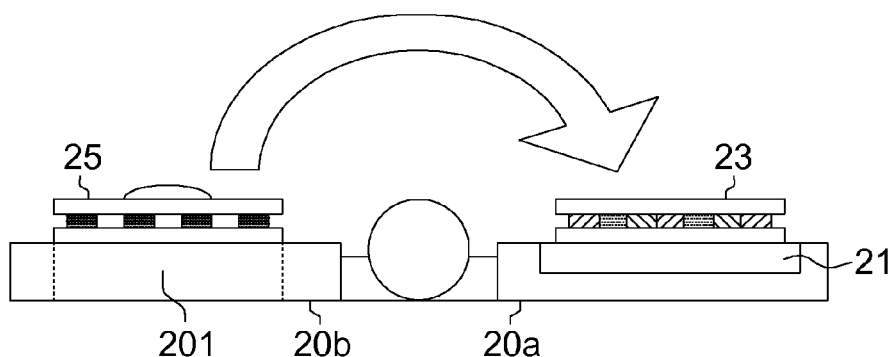
Figure 2E:
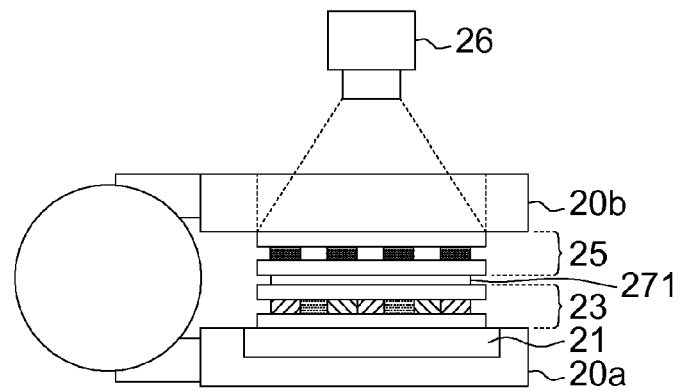
Figure 2F:
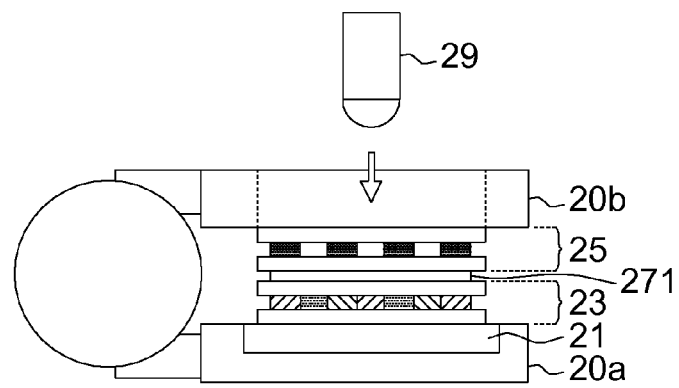
Figure 2G:
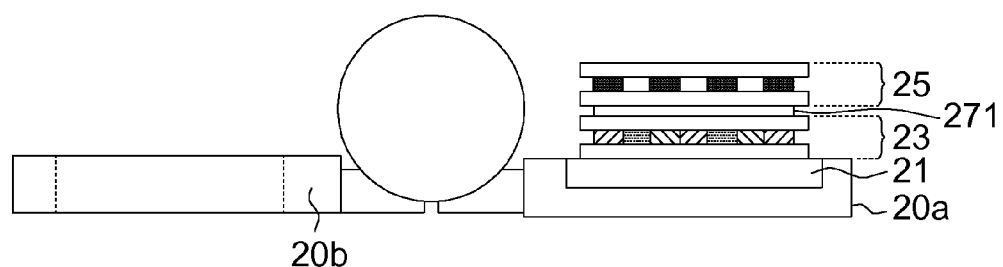

FIG. 3 illustrates a 3D alignment device according to one of the embodiment of the present disclosure. Please also refer to FIG. 2A, FIG. 2C and FIG. 2D for the beginning steps of alignment procedures. In a 3D alignment device 3 of the embodiment, a 3D barrier module 34 loaded on a barrier stage 30b is laminated on a display panel 33 (ex: LCD panel or OLED panel) loaded on a display x-y stage 30a (with a backlight 31 thereon), and an UV glue 371 is disposed between the 3D barrier module 34 and the display panel 33. The 3D alignment device 3 at least comprises an image capture tool 36 disposed above the barrier stage 30b and an alignment shift analysis software 35 coupled to the image capture tool 36. The image capture tool 36, such as a camera, captures an image of a moiré pattern generated by the display alignment check pattern on the display panel 33 and the barrier alignment check pattern on the 3D barrier module 34, where the patterns are presented by image-inputting or directly forming/marking The alignment shift analysis software 35 coupled to the image capture tool 36 is executed by a processor comprising logic. In the embodiment, only one camera is required for implementation and x position of the camera would be the same as center of panel. The distance between the image capture tool 36 and the 3D barrier module 34 is deviated from an optimum 3D viewing distance.

In the embodiment, the alignment shift analysis software 35 analyzes the image of the moiré pattern, and determines at least three measurement points correspondingly at an upper virtual line and a lower virtual line of the image of the moiré pattern. Also, a position shift, such as Δx or/and Δy, for each of the measurement points is calculated by the alignment shift analysis software. Also, a rotation angle (at a x-y plane) between the display panel and the barrier could be calculated by the alignment shift analysis software 35, according to the position shift calculation results of the measurement points.

Optionally, the 3D alignment device 3 further includes a main control unit 381 (such as a processor/computer comprising logic) and a x-y stage control unit 383 coupled to the x-y stage 30a and the alignment shift analysis software 35. The x-y stage control unit 383 is used for adjusting corresponding position between the display panel 33 and the barrier according to the position shift results of the measurement points and the rotation angle (ex: if the position shift results of the measurement points and the rotation angle exceed predetermined alignment errors). Also, the 3D alignment device 3 might optionally include a display image control unit 385 and a barrier voltage control unit 387 respectively coupled to the display panel 33 and the 3D barrier module 34, if the display alignment check pattern on the display panel 33 and the barrier alignment check pattern on the 3D barrier module 34 are presented by image-inputting. The display image control unit 385 and the barrier voltage control unit 387 are also coupled to the main control unit 381.

Although the 3D barrier module 34 is illustrated in FIG. 3, it is noted that a barrier with a fixed barrier pattern for alignment check and 3D effect and a barrier which a fixed barrier alignment check pattern marked on could be applied on the display panel 33 for implementing the alignment method of the disclosure. If the barrier has a fixed barrier alignment check pattern, it is no need to set the display image control unit 385 and the barrier voltage control unit 387.

<Embodiment 1>

Figure 4A:
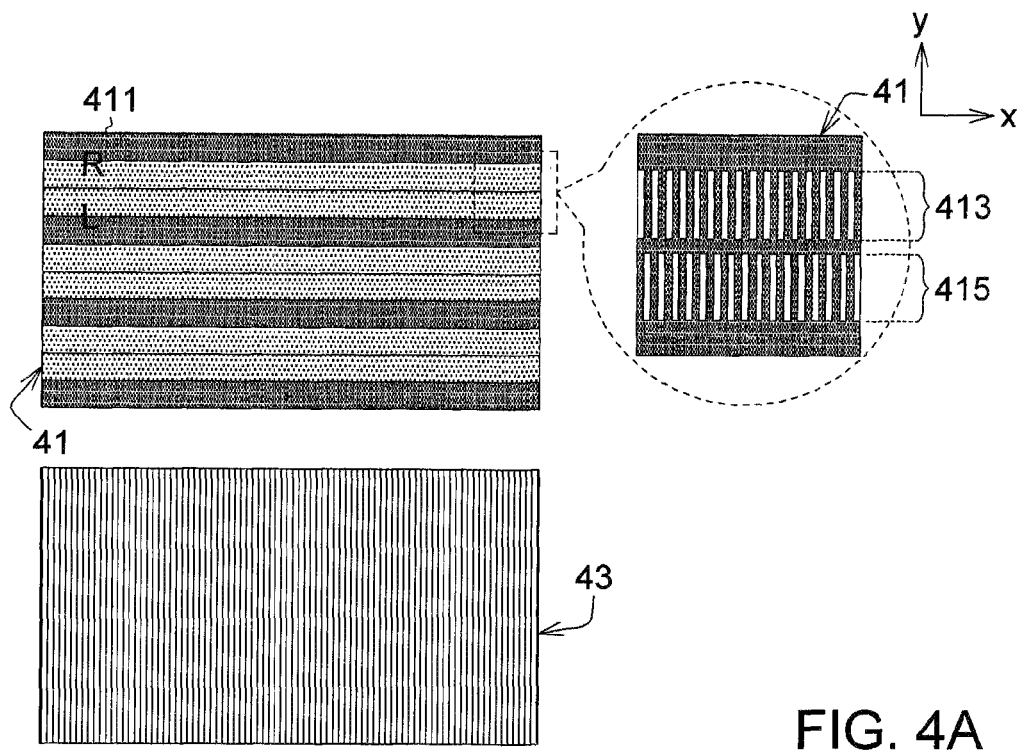
FIG. 4A illustrates one combination of alignment check patterns on the display panel and the barrier of a two-view 3D display according to Embodiment 1 of the disclosure.

FIG. 4A illustrates one combination of alignment check patterns on the display panel and the barrier of a two-view 3D display according to Embodiment 1 of the disclosure. Please also refer to FIG. 3. Two-view display creates two viewing windows, which comprises plural right (R) pixels and left (L) pixels respectively for right eye view and left eye view (i.e. for directing the R and L images to the left eye and the right eye). Thus, left and right images are displayed in different sets of pixels on the display, and each eye of a viewer is able to see the appropriate image on the display through a viewing window. As shown in FIG. 4A, a display alignment check pattern 41 (e.g. LCD image) presented on the display panel 33 includes several interlaced. horizontal stripes 411 (ex: parallel to x-direction) with a characteristic order of grey scales. The enlarged portion of display alignment check pattern 41 is also shown in FIG. 4A, which could be divided into two parts of stripes, including a first group 413 of opaque and transmissive interlaced vertical stripes to show the right (R) pixels on image only (i.e. showing image for right eye only), and a second group 415 of opaque and transmissive interlaced vertical stripes to show the left (L) pixels on image only. Those vertical stripes are extended along the y -direction. In FIG. 4A, merely a small part of the display alignment check pattern 41 is depicted, and several first groups 413 and second groups 415 are interlaced with each other to form a whole display alignment check pattern 41. A barrier alignment check pattern 43 (e.g. barrier image) presented on the barrier and corresponding to the display alignment check pattern 41 is also shown in FIG. 4A, which is a slit pattern or an image pattern with alternative black and white (i.e. opaque and transmissive) stripes.

In this embodiment, the display alignment check pattern 41 and the barrier alignment check pattern 43 could be presented by inputting a LCD interlaced image on the display panel 33 and inputting a barrier image on the barrier module 34. Also, the barrier alignment check pattern 43 could be just a fixed barrier pattern formed on the barrier. The disclosure has no limitation thereto.

Figure 4B:
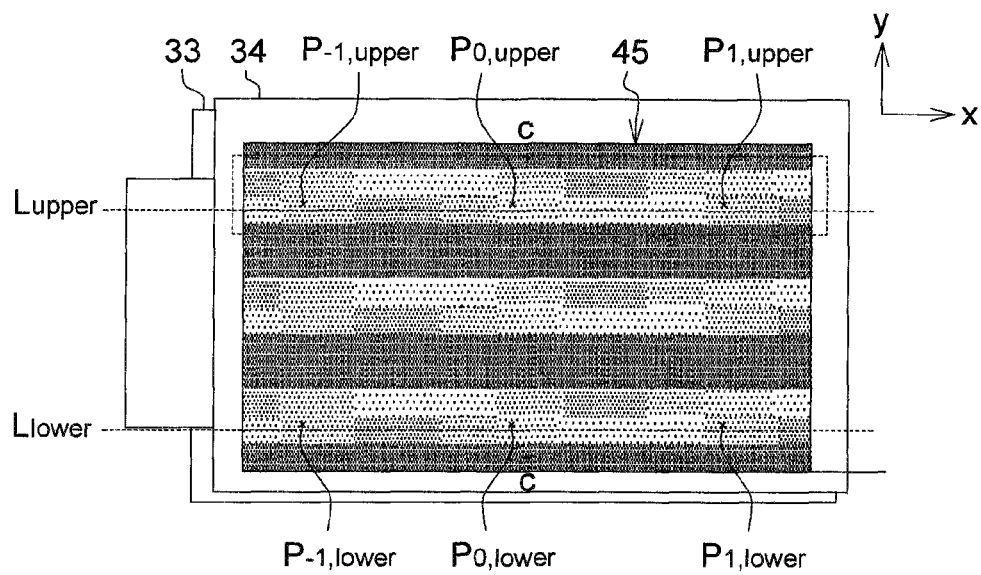
FIG. 4B shows a moiré pattern generated by the display alignment check pattern and the barrier alignment check pattern of FIG. 4A.

FIG. 4B shows a moiré pattern generated by the display alignment check pattern and the barrier alignment check pattern of FIG. 4A. After the display alignment check pattern and the barrier alignment check pattern are shown (by image inputting or directly marking) on the display panel and on the barrier, the image capture tool 36 captures an image of a moiré pattern 45 generated by the display alignment check pattern 41 and the barrier alignment check pattern 43 above. The image of moiré pattern 45 is analyzed by the alignment shift analysis software 35, to determine at least three measurement points correspondingly at an upper virtual line ($L_{upper}$) and an lower virtual line ($L_{lower}$) of the image of the moiré pattern 45. In the Embodiment 1, six measurement points are obtained for determining for position shift and rotation angle, including points $P_{-1,upper}$, $P_{0,upper}$ and $P_{1,upper}$ at the upper virtual line $L_{upper}$, and $P_{-1,lower}$, $P_{0,lower}$ and $P_{1,lower}$ at the lower virtual line $L_{lower}$. Then, a position shift, such as a x-position shift (Δx) or a y-position shift (Δy), for each of the measurement points is calculated by the alignment shift analysis software 35.

Figure 4C:
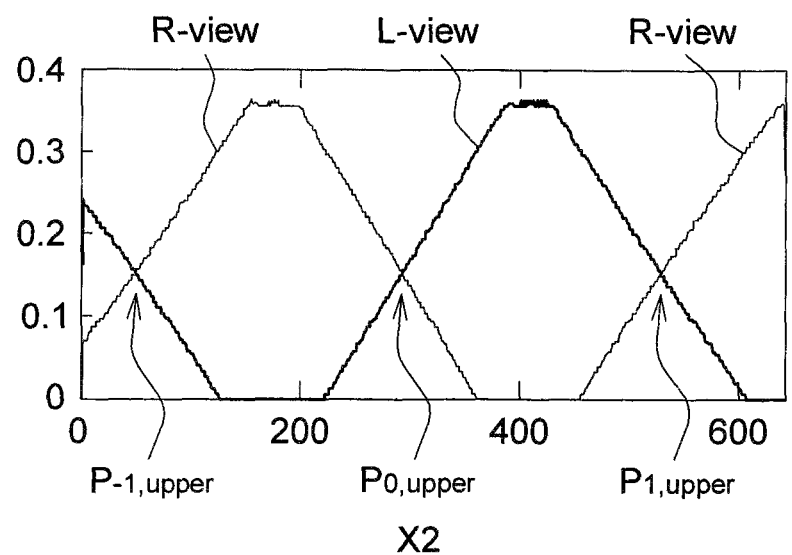
FIG. 4C illustrates the intensity data extract versus position of the image of the moiré pattern of FIG. 4B analyzed by the alignment shift analysis software.

FIG. 4C illustrates the intensity data extract versus position of the image of the moiré pattern of FIG. 4B analyzed by the alignment shift analysis software. In the embodiment, the image of the moiré pattern 45 analyzed by the alignment shift analysis software 35 comprises step of plotting extracted brightness intensity data versus position of the image of the moiré pattern 45, and several R-view and L-view curves are shown as in FIG. 4C. R-view and L-view curves represent the eye brightness intensity received by the right eye and left eye varied with the x-position, respectively. The measurement points, such as $P_{-1,upper}$, $P_{0,upper}$ and $P_{1,upper}$ of FIG. 4C, are determined by finding the crossing points of the R-view and L-view curves, and each point has the same brightness of different views (i.e. R-view and L-view). At those measurement points (such as $P_{-1,upper}$, $P_{0,upper}$ and $P_{1,upper}$) of the image of the moiré pattern 45, the right eye and left eye receive the same brightness intensity.

Figure 4D:
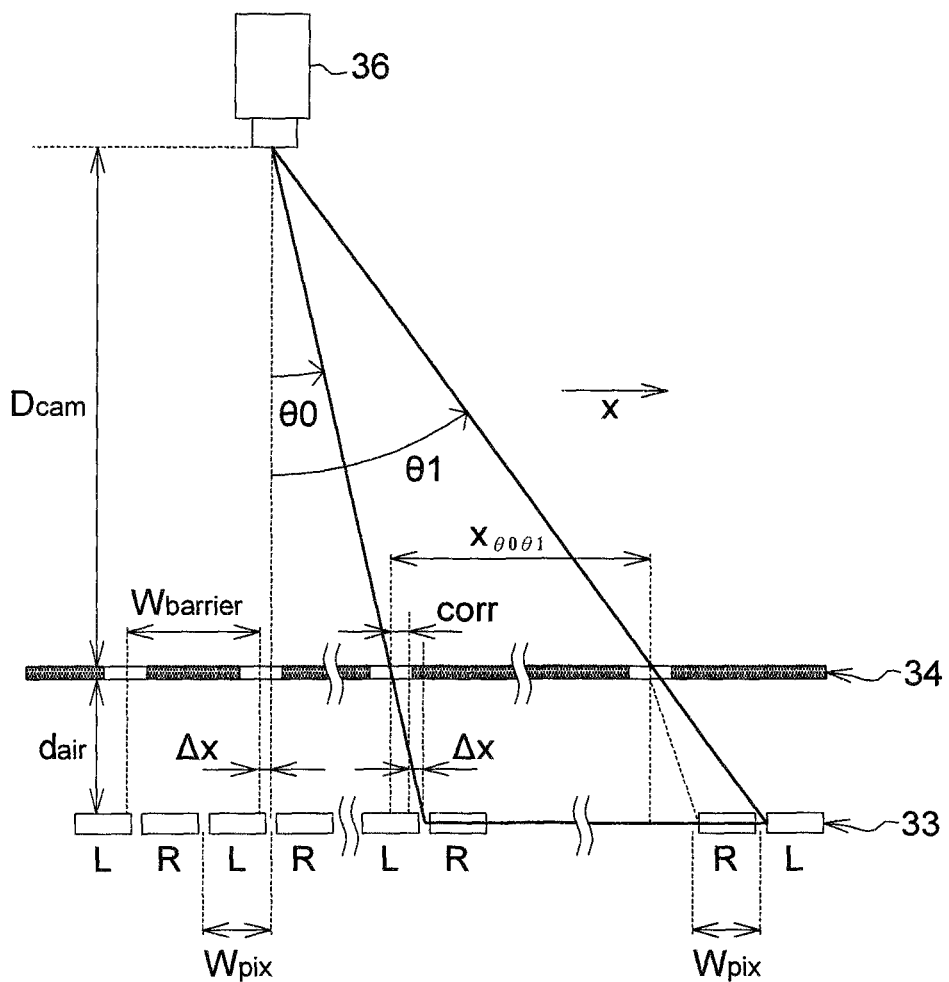
FIG. 4D is a simple drawing of the image capture tool, the barrier and R and L pixels of the display panel beneath the barrier according to the Embodiment 1 of the disclosure.

FIG. 4D is a simple drawing of the image capture tool, the barrier and R and L pixels of the display panel beneath the barrier according to the Embodiment 1 of the disclosure. The following description represents the calculation formulas for 3D image based alignment method of the embodiments. Please also refer FIG. 4D for the related parameters of the calculation formulas. Two measurement points, such as $P_{0,upper}$ and $P_{1,upper}$ are taken for illustration, and calculations of an x-position shift (Δx), and an optical distance ($d_{air}$) of measurement points between corresponding pixel of the display panel 33 and the barrier module 34 in air are represented as below.

$$\Delta x = -d_{air} \times \tan\theta_0 + D_{cam} \cdot \tan\theta_0 \cdot \left(\frac{2 \cdot W_{pix}}{W_{barrier}} - 1\right) \quad (1)$$

In equation (1), $D_{cam} \cdot \tan\theta_0 \cdot \left(\frac{2 \cdot W_{pix}}{W_{barrier}} - 1\right)$ is for view point correction.

$$\frac{x_{\theta 0\theta 1} \frac{2 \cdot W_{pix}}{W_{barrier}} + W_{pix}}{x_{\theta 0\theta 1}} = \frac{D_{cam} + d_{air}}{D_{cam}} \quad (2)$$

$$x_{\theta 0\theta 1} = D_{cam} \cdot |\tan\theta_1 - \tan\theta_0| \quad (3)$$

From equations (1), (2) and (3), (4)

$$d_{air} = \frac{W_{pix}}{|\tan\theta_1 - \tan\theta_0|} + D_{cam} \cdot \left(\frac{2 \cdot W_{pix}}{W_{barrier}} - 1\right)$$

$$\Delta x = \frac{-W_{pix} \cdot \tan\theta_0}{|\tan\theta_1 - \tan\theta_0|} \quad (5)$$

where $\Delta x$ is a x-position shift, $d_{air}$ is an optical distance(/gap) between pixel and the barrier module 34 in air, $W_{pix}$ is pixel width, $W_{barrier}$ is barrier width, and $D_{cam}$ is a vertical distance between the image capture tool 36 and the barrier module 34. Those parameters of the equations (1)-(5) have been depicted in FIG. 4D.

As shown in the $\Delta x$ equation and FIG. 4D, the x-position shift ($\Delta x$) can be calculated by two angles ($\theta_0$, $\theta_1$) of two points such as $P_{0,upper}$ and $P_{1,upper}$. The calculation of $\Delta x$ and $d_{air}$ for the lower/upper points is carried out by the alignment shift analysis software 35. Accordingly, x-position shift ($\Delta x$, upper), x-position shift ($\Delta x$, lower), 3D optical gap ($d_{air}$) and rotation error (degree) can be obtained using the steps and calculation formulas described above. Similarly, y-position shift ($\Delta y$) could be calculated by the similar algorithm as equation (5).

Also, two position calculation cases, i.e. the point sets at the upper virtual line $L_{upper}$ and the lower virtual line $L_{lower}$, are adopted to estimate the rotation angle in Embodiment 1, but the disclosure is not limited to only two virtual lines. More point sets at more than two virtual lines are applicable for the calculation of the alignment method. Also, panel center marks C (as "+") in FIG. 4B can be used to get position error. Moreover, although 6 measurement points are demonstrated in Embodiment 1, the disclosure is not limited thereto. To determine whether x-position shift and rotation occur, at least three measurement points are required. For example, if the image capture tool 36 is positioned correspondingly to a virtual center line C-C (in FIG. 4B) of the display panel, two measurement points could be positioned correspondingly to the virtual center line C-C of the display panel (which two points are respectively at the upper virtual line $L_{upper}$ and the lower virtual line $L_{lower}$), and the third measurement point is at the upper virtual line $L_{upper}$ or at the lower virtual line $L_{lower}$ by spacing apart from the first and second measurement points. Please refer to FIG. 4B, three measurement points such as points $P_{0,upper}$, $P_{0,lowe}$, and one point of $P_{1,upper}$, $P_{-1,upper}$, $P_{-1,lower}$, and $P_{1,lower}$ could be selected for calculation. Of course, more measurement points (which distributed at more virtual lines) collected and calculated by the alignment shift analysis software 35, more accurate alignment result between the barrier and the display panel of the 3D display achieved. Also, the upper virtual line $L_{upper}$ and the lower virtual line $L_{lower}$ are not limited the plotting positions in FIG. 4B, and could be varied according to the requirements of practical application.

After calculations of position shift (such as $\Delta x$), $d_{air}$ and rotation error (degree) are completed by the alignment shift analysis software 35, as described above, the corresponding position between the display panel 33 and the barrier module 34 is adjusted by the stage control unit 383 (FIG. 3, which is coupled to the alignment shift analysis software 35) if the position shift results of the measurement points and the rotation angle exceed an predetermined alignment error.

Figure 5:
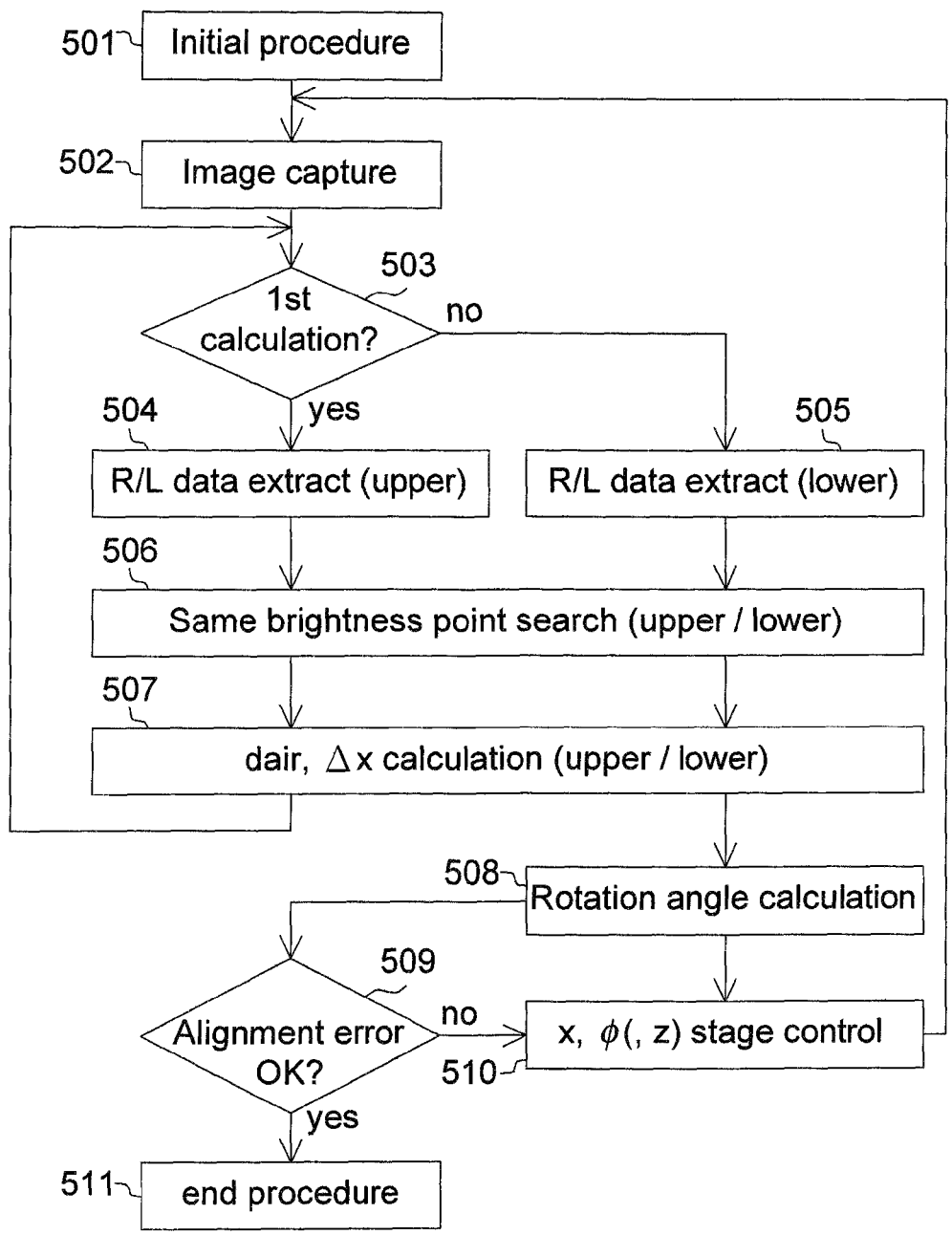
FIG. 5 is a flow chart of a 3D image based alignment method according to Embodiment 1 of the disclosure.

FIG. 5 is a flow chart of a 3D image based alignment method according to Embodiment 1 of the disclosure. In step 501, an initial procedure, such as loading the display (such as LCD) and the 3D barrier samples on the stages, turning the display and the 3D barrier ON, conducting pre-alignment, and inputting the special alignment check pattern to the display panel (barrier alignment check pattern could be presented by image-inputting or fixedly-marking), is performed. In step 502, an image capture procedure is performed by an image capture tool 36, to capture an image of a moiré pattern generated by the barrier alignment check pattern overlying the display alignment check pattern. In step 503, whether the calculation of the alignment shift analysis software 35 has been performed is determined. If no calculation has been performed, the procedures for calculating the position shifts ($\Delta x$ or $\Delta y$) and the optical distance $d_{air}$ between the barrier and pixel of the measurement points at an upper virtual line $L_{upper}$ are conducted by the alignment shift analysis software, as depicted in steps 504, 506 and 507. After completing the calculation of the upper measurement point, the calculations of the related parameters of the lower measurement points at a lower virtual line $L_{lower}$, are subsequently conducted, as depicted in steps 505, 506 and 507. In step 508, the rotation angle calculation can be conducted by the alignment shift analysis software 35, using the results of position shift and $d_{air}$ of the upper and lower measurement points. The details of steps 504~508 have been discussed in the aforementioned description and not redundantly repeated here.

Afterward, in step 509, whether the alignment between the display panel and the barrier is accurate is determined by checking the calculation results (such as $\Delta x$, or $\Delta y$, $d_{air}$ and rotation angle). The predetermined alignment error (i.e. allowable error) is previously inputted in the alignment shift analysis software 35. If the calculation results exceed the predetermined alignment errors, position shift, rotation angle ($\phi$) and/or optical gap ($d_{air}$, along the z-axis) stage control is executed, as indicated in step 510. The $\Delta x/\Delta y$, $\phi$ and/or $d_{air}$ stage control is performed by the x-y stage control unit 383 coupled to the x-y stage 30a and the alignment shift analysis software 35 for adjusting alignment condition between the display panel 33 and the barrier module 34. If the alignment shift analysis software 35 judges the calculation results within the predetermined alignment errors, the end procedure (such as display panel turn-off, barrier turn-off, unload display panel and barrier sample) of alignment is executed, as indicated in step 511. For example, if a predetermined alignment error of x-position shift, $\Delta x$, is set as ±5 µm, and $\Delta x$(upper)≤±5 µm and $\Delta x$(lower)≤±5 µm, the alignment error is determined as "OK" by the alignment shift analysis software 35 in step 509. In one embodiment, a predetermined alignment error of position shift $\Delta x$ is ±3 µm. In another embodiment, a predetermined alignment error of position shift $\Delta x$ is ±1 µm. However, the disclosure is not limited to those values, and the predetermined alignment error could be changed depending on the requirements of practical applications.

<Simulations and Results>

Simulations of optical gap $d_{air}$ and position shift $\Delta x$ have been conducted, and the results are compared with the ideal values to investigate the lamination accuracy.

In Test 1, the ideal optical gap $d_{air}$ (ideal) is initially set as a fixed value (=424.043 µm), while the ideal position shifts $\Delta x$ (ideal) of six measurement points are initially set as −45 μm, −20 μm, 0 μm, 5 μm, 10 μm and 45 μm. Also, all other geometry of LCD pixels (e.g. 4.5", 1280×720) and 3D optical components are set for ray tracing type simulation. Then, a simulated moiré screen image is outputted on the camera position Dcam of 125 mm. The simulation results of optical gap $d_{air}$ (measured) and position shift $\Delta x$ (measured) are estimated and calculated by the disclosed algorithm and the formulas as described above, and the results are listed in Table 1. Then, the errors between the initial setting and measured (simulated) are compared for investigating the accuracy of alignment of the disclosure. The errors of optical gap $d_{air}$ (error) and position shifts $\Delta x$ (error) are the differences between the ideal values and the measured values, which are also listed in Table 1.

The results in Table 1 have indicated that lamination position shift ($\Delta x$) amounts between display panel and barrier can be correctly estimated by the algorithm and method described above of about ±0.2 mm accuracy.

TABLE 1

| $d_{air}$ (ideal) (μm) | 424.043 | 424.043 | 424.043 | 424.043 | 424.043 | 424.043 |
|---|---|---|---|---|---|---|
| $\Delta x$ (ideal) (μm) | −45 | −20 | 0 | 5 | 10 | 45 |
| $d_{air}$ (measured) (μm) | 422.29 | 420.69 | 419.66 | 420.74 | 420.46 | 421.53 |
| $\Delta x$ (measured) (μm) | −44.92 | −19.83 | 0.00 | 5.00 | 10.00 | 45.02 |
| $d_{air}$ (error) (μm) | −1.754 | −3.357 | −4.380 | −3.305 | −3.584 | −2.511 |
| $\Delta x$ (error) (μm) | 0.083 | 0.170 | 0.002 | 0.002 | −0.003 | 0.021 |

Also, accuracy of the optical gap $d_{air}$ between display and barrier is investigated herein. In Test 2, the position shift $\Delta x$ (ideal) is initially set as a fixed value (=5 μm), while the ideal optical gap $d_{air}$ (ideal) are initially set as 424.043, 457.827, 491.611 and 525.395 μm. The simulation results of optical gap $d_{air}$ (measured) and position shift $\Delta x$ (measured) are estimated and calculated by the disclosed algorithm and the formulas as described above, and the results are listed in Table 2. Also, the errors of optical gap $d_{air}$ (error) and position shifts $\Delta x$ (error) are obtained by comparing the ideal values and the measured values, which are also listed in Table 2.

The results in Table 2 have indicated that the optical gap process variation ($d_{air}$) between display and barrier cell can be correctly estimated by this algorithm and method described above of about ±6 μm accuracy.

TABLE 2

| $d_{air}$ (ideal) (μm) | 424.043 | 457.827 | 491.611 | 525.395 |
|---|---|---|---|---|
| $\Delta x$ (ideal) (μm) | 5 | 5 | 5 | 5 |
| $d_{air}$ (measured) (μm) | 417.93 | 452.64 | 488.45 | 524.06 |
| $\Delta x$ (measured) (μm) | 4.89 | 5.10 | 4.83 | 4.83 |
| $d_{air}$ (error) (μm) | −6.117 | −5.183 | −3.165 | −1.339 |
| $\Delta x$ (error) (μm) | −0.109 | 0.100 | −0.171 | −0.168 |

<Embodiment 2>

Figure 6A:
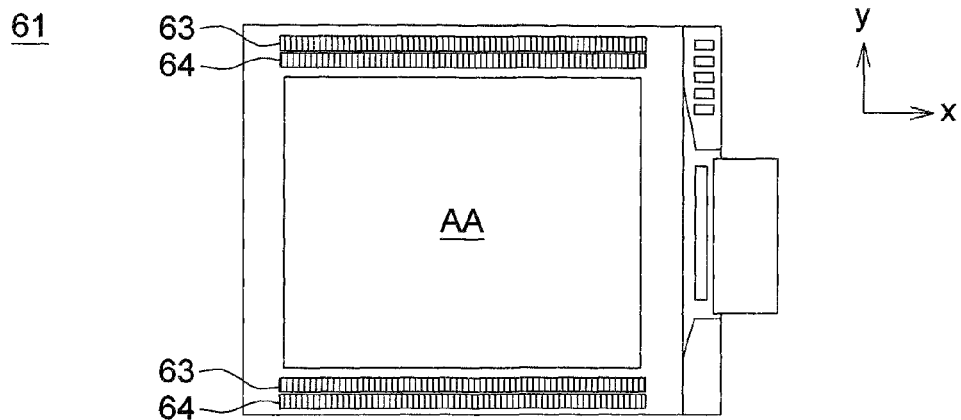
FIG. 6A illustrates a display alignment check pattern formed on the display panel of a two-view 3D display according to Embodiment 2 of the disclosure.
Figure 6B:
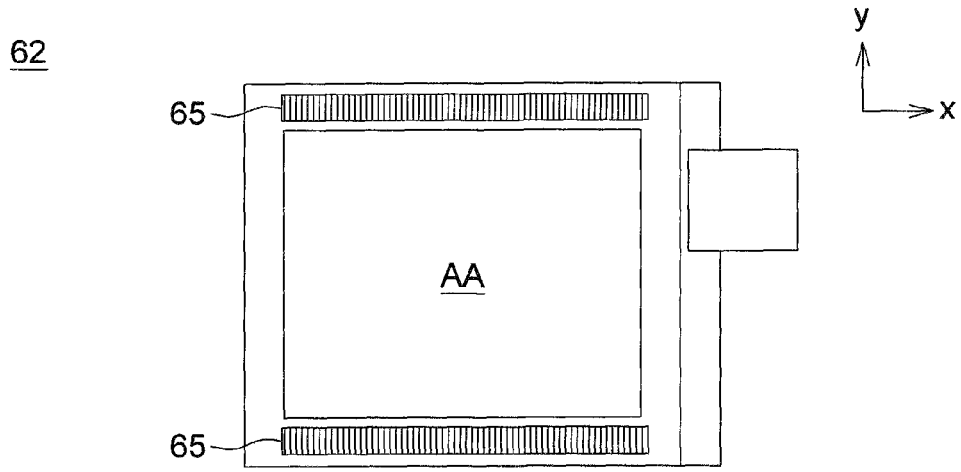
FIG. 6B illustrates a barrier alignment check pattern formed on the barrier of the two-view 3D display according to Embodiment 2 of the disclosure.

Please refer to FIG. 6A and FIG. 6B. FIG. 6A illustrates a display alignment check pattern formed on the display panel of a two-view 3D display according to Embodiment 2 of the disclosure. FIG. 6B illustrates a barrier alignment check pattern formed on the barrier of the two-view 3D display according to Embodiment 2 of the disclosure. In Embodiment 2, those 3D corresponding alignment check patterns are fixed patterns, and the display image control unit 385 for display panel 61 and the barrier voltage control unit 387 for barrier 62 are no need. The display alignment check pattern is located outside the active area (AA), such as at a border area of a color filter of display panel 61. The barrier alignment check pattern is located at the barrier 62 (e.g. 3D component, such as 3D barrier cell or 3D LC lens cell), and arrangement of the barrier alignment check pattern is corresponding to the display alignment check pattern of the display panel 61. Also, the display alignment check pattern includes a first set 63 of opaque and transmissive interlaced vertical stripes, and a second set 64 of opaque and transmissive interlaced vertical stripes, and the first set 63 and the second set 64 are formed at a longer side of the display panel 61, as shown in FIG. 6A. Also, two pairs of the first sets 63 and the second sets 64 are formed at the upper and lower parts of the border area of the display. The barrier alignment check pattern includes a third set 65 of opaque and transmissive interlaced vertical stripes formed at a longer side of the barrier 62. Also, two of the third sets 65 are respectively formed at the upper and lower parts of the barrier. In Embodiment 2, those opaque and transmissive stripes of the first set 63, the second set 64 and the third set 65 are vertical to the x-direction. Also, the longitudinal length along the y-direction of third set 65 covers the vertical extent of the first set 63 and the second set 64 (i.e the sum of the longitudinal lengths of the first and second sets and the space therebetween). The lateral lengths along the x-direction of the first set 63, the second set 64 and the third set 65 are substantially identical.

Figure 7A:
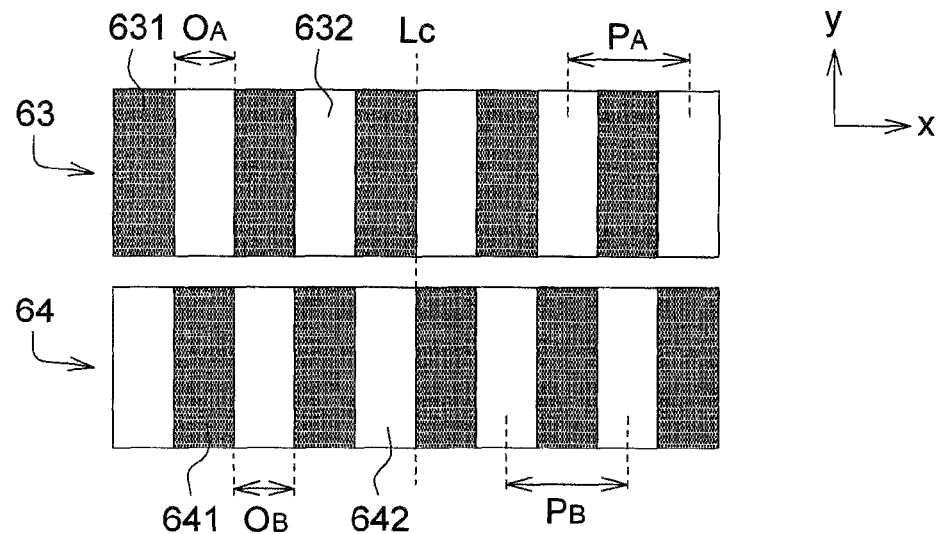
FIG. 7A is a partially enlarging view of the display alignment check pattern on the display panel of FIG. 6A.
Figure 7B:
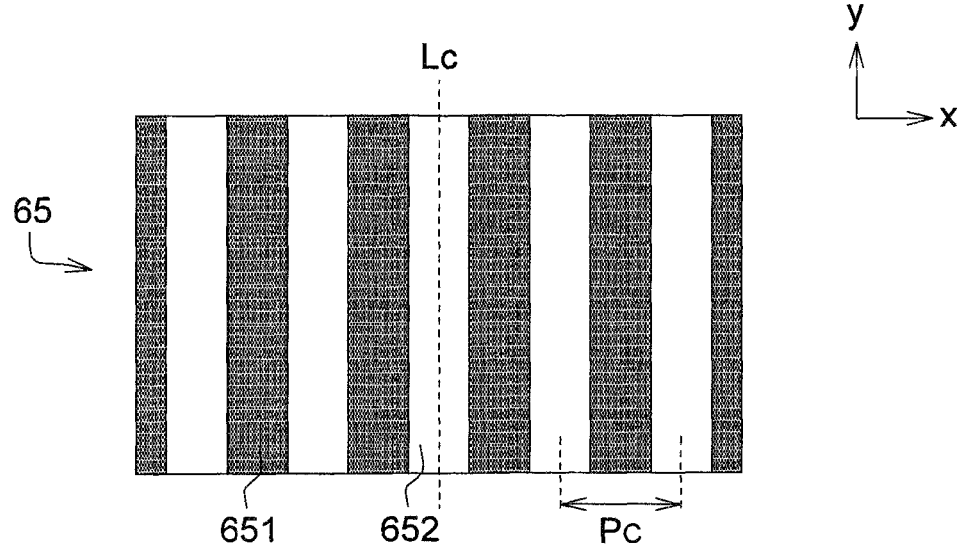
FIG. 7B illustrates is a partially enlarging view of the barrier alignment check pattern on the barrier of FIG. 6B.

FIG. 7A is a partially enlarging view of the display alignment check pattern on the display panel of FIG. 6A. FIG. 7B illustrates is a partially enlarging view of the barrier alignment check pattern on the barrier of FIG. 6B. As shown in FIG. 7A, the first set 63 includes several opaque vertical stripes 631 interlaced with several transmissive vertical stripes 632, and the second set 64 similarly includes several opaque vertical stripes 641 interlaced with several transmissive vertical stripes 642, wherein the second set 64 is positioned at one side of the first set 63. In Embodiment 2, aperture of the first set 63, $O_A$, is identical to aperture of the second set 64, $O_B$. As shown in the FIG. 7A, the opaque stripes 631 and 641 and the transmissive stripes 632 and 642 have, but not limited, identical width. Also, the second set 64 is a horizontal mirror pattern of the first set 63 from a virtual vertical center line $L_C$ of the display panel 61, wherein the virtual vertical center line $L_C$ is corresponding to the boundaries between the opaque stripes and the transmissive stripes of the first set 63 and the second set 64. As shown in FIG. 7B, the third set 65 includes several opaque vertical stripes 651 interlaced with several transmissive vertical stripes 652, and a middle position of the transmissive stripe 652 is aligned with the virtual vertical center line $L_C$ of the display panel 61. As shown in the FIG. 7A and FIG. 7B, the opaque stripes 631, 641 and 651 and the transmissive stripes 632, 642 and 652 have identical width; thus, the stripe pitch $P_A$ of the first set 63, the stripe pitch $P_B$ of the second set 64 and the stripe pitch $P_C$ of the third set 65 are substantially identical.

The 3D image based alignment method of Embodiment 2 is similar to that of Embodiment 1, except the adopted 3D alignment check patterns and the way to present the 3D alignment check patterns (i.e. image-input patterns used in Embodiment 1, while fixed patterns adopted in Embodiment 2). Please refer Embodiment 1 for the details of the 3D image based alignment method, such as image capture of a moiré pattern generated by the display alignment check pattern and the barrier alignment check pattern, determination of measurement points and calculation of corresponding position shift (Δx/Δy), rotation angle (ϕ) and/or optical gap (d$_{air}$, along the z-axis) by the alignment shift analysis software, adjustment if calculation results exceed predetermined alignment errors, etc. Those details are not redundantly described herein.

<Embodiment 3>

The 3D image based alignment method of Embodiment 3 is applicable for a landscape and portrait modes switchable two-view 3D display. The 3D alignment check patterns, the calculation and steps of alignment and adjustment are very similar to Embodiment 1.

Figure 8A:
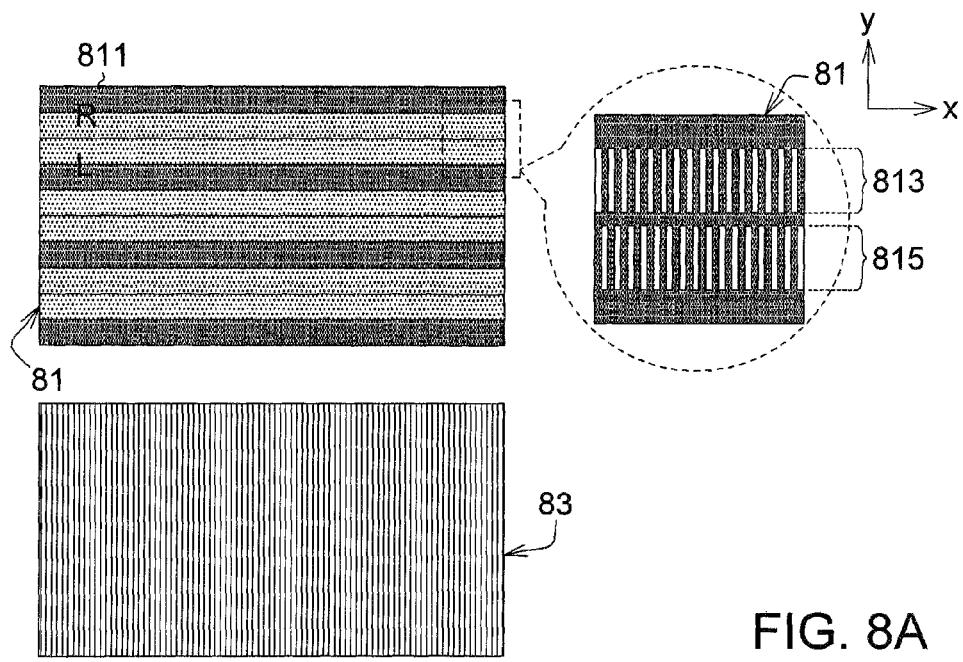
FIG. 8A illustrates one combination of alignment check patterns on the display panel and the barrier for the landscape mode of a two-view 3D display according to Embodiment 3 of the disclosure.
Figure 8B:
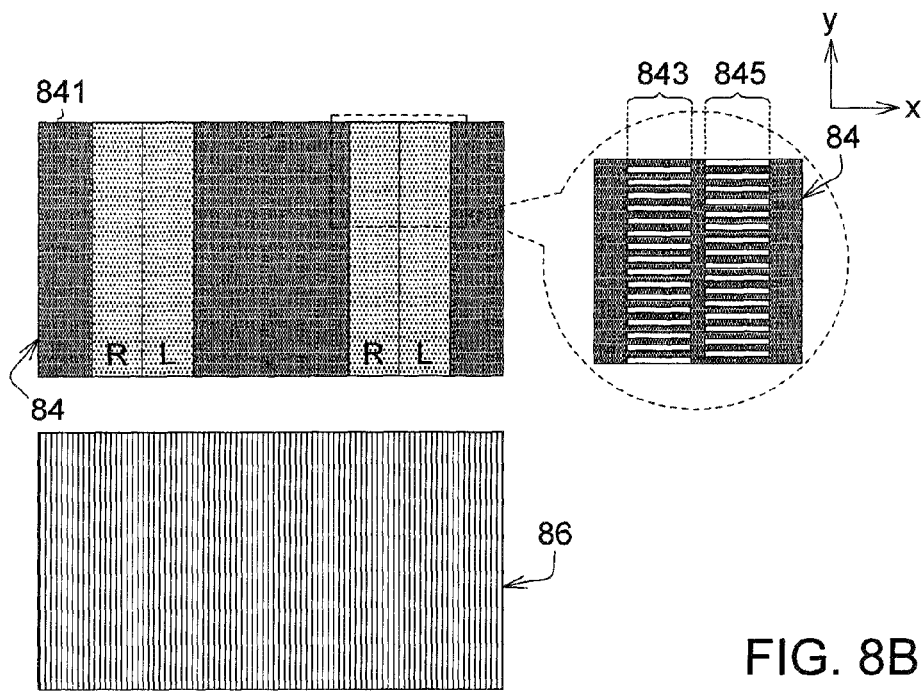
FIG. 8B illustrates one combination of alignment check patterns on the display panel and the barrier for the portrait mode of the two-view 3D display according to Embodiment 3 of the disclosure.

Please refer to FIG. 3, FIG. 8A and FIG. 8B. FIG. 8A illustrates one combination of alignment check patterns on the display panel and the barrier for the landscape mode of a two-view 3D display according to Embodiment 3 of the disclosure. In FIG. 8A, a landscape display alignment check pattern 81 and a landscape barrier alignment check pattern 83 are respectively inputted on the display panel 33 and the barrier module 34, performed by the display image control unit 385 and the barrier voltage control unit 387, for proceeding a landscape-mode alignment calculation. The landscape display alignment check pattern 81 (e.g. landscape mode LCD image) includes several interlaced horizontal stripes 811 (ex: parallel to x-direction) with a particular order of grey scales, as shown in FIG. 8A. The enlarged portion of landscape display alignment check pattern 81 is also shown in FIG. 8A, which could be divided into two parts of stripes, including a first landscape-mode group 813 of opaque and transmissive interlaced stripes to allow showing the right (R) pixels on image only (i.e. showing image for right eye only), and a second landscape-mode group 815 of opaque and transmissive interlaced stripes to allow showing the left (L) pixels on image only. Those stripes of the landscape-mode groups (813 and 815) are extended along the y-direction. A landscape barrier alignment check pattern 83 (e.g. barrier image) presented on the barrier module 34 and corresponding to the landscape display alignment check pattern 81 is also shown in FIG. 8A, which is a pattern with alternative black and white (i.e. opaque and transmissive) stripes.

FIG. 8B illustrates one combination of alignment check patterns on the display panel and the barrier for the portrait mode of the two-view 3D display according to Embodiment 3 of the disclosure. As shown in FIG. 8B, a portrait display alignment check pattern 84 and a portrait barrier alignment check pattern 86 are respectively inputted on the display panel 33 and the barrier module 34, performed by the display image control unit 385 and the barrier voltage control unit 387, for proceeding a portrait-mode alignment calculation. The portrait display alignment check pattern 84 (e.g. portrait mode LCD image) includes several interlaced vertical stripes 841 (ex: parallel to y-direction) with a particular order of grey scales. The enlarged portion of portrait display alignment check pattern 84 is also shown in FIG. 8B, which similarly are divided into two parts of stripes, including a first portrait-mode group 843 of opaque and transmissive interlaced stripes to allow showing the right (R) pixels on image only (i.e. showing image for right eye only), and a second portrait-mode group 845 of opaque and transmissive interlaced stripes to allow showing the left (L) pixels on image only. Those stripes of the portrait-mode groups (843 and 845) are extended along the x-direction. The portrait barrier alignment check pattern 86 presented on the barrier module 34 and corresponding to the portrait display alignment check pattern 84 is also shown in FIG. 8B, which is a pattern with alternative black and white (i.e. opaque and transmissive) stripes.

Figure 9:
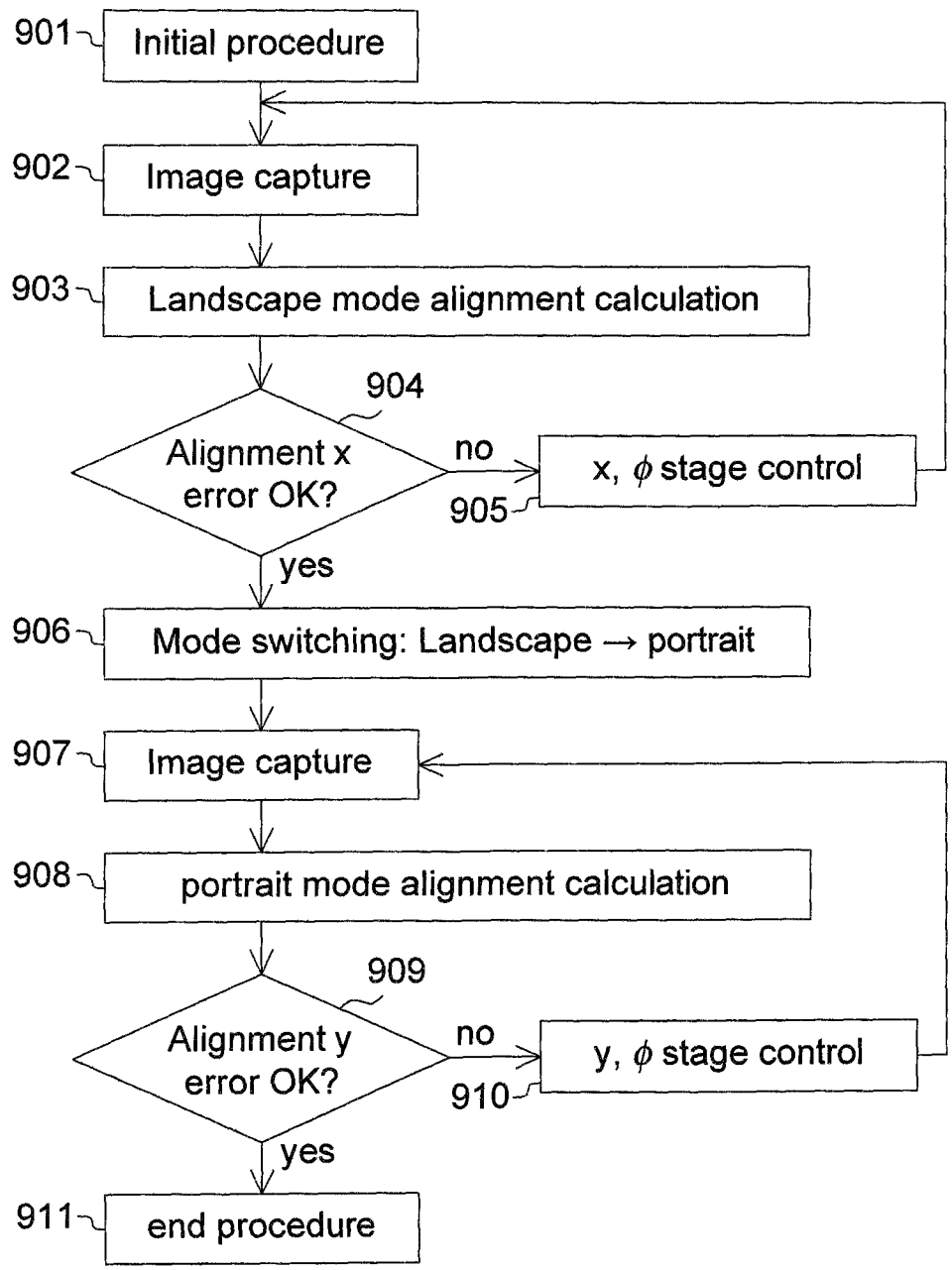
FIG. 9 is a flow chart of a 3D image based alignment method according to Embodiment 3 of the disclosure.

FIG. 9 is a flow chart of a 3D image based alignment method according to Embodiment 3 of the disclosure. In step 901, an initial procedure, such as loading the display (such as LCD) and the 3D barrier samples on the stages, turning the display and the 3D barrier ON, conducting pre-alignment, and inputting the special alignment check pattern (ex: the landscape display alignment check pattern 81 and the landscape barrier alignment check pattern 83) to the display panel 33 and the barrier module 34, is performed. In step 902, an image capture procedure is executed by an image capture tool 36, to capture an image of a moiré pattern generated by the landscape barrier alignment check pattern 83 overlying the landscape display alignment check pattern 81. In step 903, calculation of the landscape mode alignment performed by the alignment shift analysis software 35 is executed. The details of calculation in step 903 are similar to the steps 504-508 of FIG. 5 (please refer related descriptions of Embodiment 1), and not repeatedly described here. Afterward, in step 904, whether the alignment between the display panel and the barrier in the landscape mode is accurate is determined by checking the calculation results (such as Δx, or Δy, d$_{air}$ and rotation angle). If the calculation results exceed the predetermined alignment errors of the landscape mode, step 905 is executed to achieve the position shift, rotation angle (ϕ) and/or optical gap (d$_{air}$, along the z-axis) stage control. The Δx/Δy, ϕ and/or d$_{air}$ stage control is performed by the x-y stage control unit 383 coupled to the x-y stage 30a and the alignment shift analysis software 35 for adjusting alignment condition between the display panel 33 and the barrier in the landscape mode.

If the alignment shift analysis software 35 judges the calculation results within the predetermined alignment errors of the landscape mode, the display mode is switched from landscape mode to portrait mode, as indicated in step 906. Also, the portrait display alignment check pattern 84 and the portrait barrier alignment check pattern 86 are respectively presented/inputted to the display panel 33 and the barrier module 34. Similarly, step 907 is executed by capturing an image of a moiré pattern generated by the portrait barrier alignment check pattern 86 overlying the portrait display alignment check pattern 84 using the image capture tool 36. In step 908, calculation of the portrait mode alignment performed by the alignment shift analysis software 35 is executed, and the details are similar to the steps 504-508 of FIG. 5 which are not repeatedly described here. Afterward, in step 909, whether the alignment between the display panel and the barrier in the portrait mode is accurate is determined by checking the calculation results (such as Δx, or Δy, d$_{air}$ and rotation angle). If the calculation results exceed the predetermined alignment errors of the portrait mode, step 910 is executed to achieve the position shift, rotation angle (ϕ) and/or optical gap (d$_{air}$, along the z-axis) stage control. The Δx/Δy, ϕ and/or d$_{air}$ stage control is performed by the x-y stage control unit 383 coupled to the x-y stage 30a and the alignment shift analysis software 35 for adjusting alignment condition between the display panel 33 and the barrier in the portrait mode. If the alignment shift analysis software 35 judges the calculation results within the predetermined alignment errors of the portrait mode, the end procedure (such as display panel turn-off, barrier turn-off, unload display panel and barrier sample) is executed, as indicated in step 911.

Although FIG. 9 illustrates the alignment steps (such as check, calculation and adjustment steps) of the landscape mode performed before that of the portrait mode, the disclosure is not limited thereto. The alignment steps of the portrait mode could be performed before that of the landscape mode, alternatively.

<Embodiment 4>

The 3D image based alignment method of Embodiment 4 is also applicable for a landscape and portrait modes switchable two-view 3D display. The alignment check patterns, the calculation and steps of alignment and adjustment of Embodiment 4 are very similar to Embodiment 2 and 3. The major difference between Embodiments 4 and 3 is that the 3D alignment check patterns are fixed patterns, and the display image control unit 385 for display panel and the barrier voltage control unit 387 for barrier are no need. Also, both landscape mode alignment check pattern (sets 63-65 of vertical stripes) and portrait mode alignment check pattern (sets 67-69 of horizontal stripes) are fabricated on both display and 3D component panel.

Figure 10A:
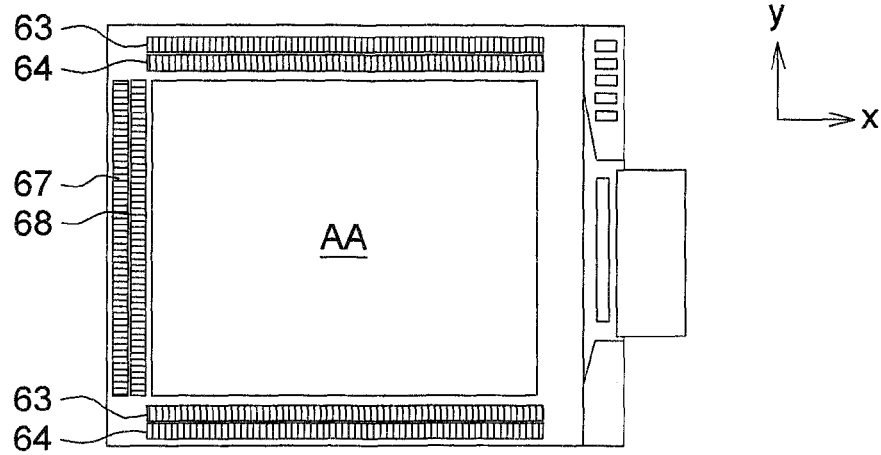
FIG. 10A illustrates the landscape and portrait display alignment check patterns formed on the display panel of the landscape mode of a two-view 3D display according to Embodiment 4 of the disclosure.
Figure 10B:
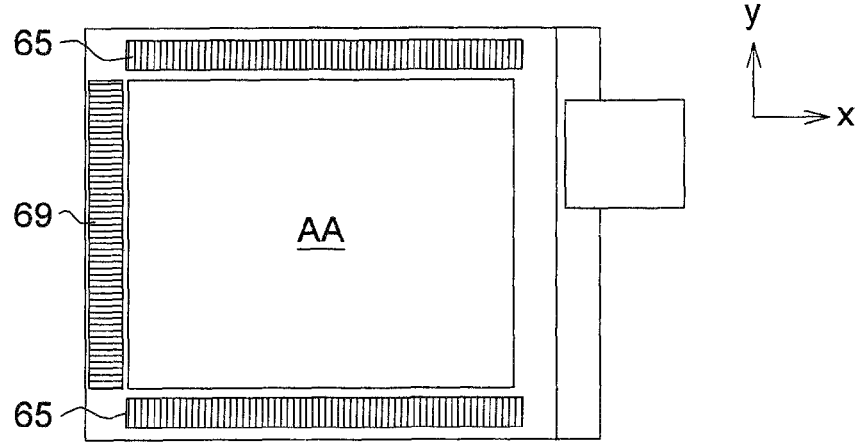
FIG. 10B illustrates the landscape and portrait barrier alignment check patterns formed on the barrier of the landscape mode of the two-view 3D display according to Embodiment 4 of the disclosure.

Please refer to FIG. 10A and FIG. 10B. FIG. 10A illustrates the landscape and portrait display alignment check patterns formed on the display panel of the landscape mode of a two-view 3D display according to Embodiment 4 of the disclosure. FIG. 10B illustrates the landscape and portrait barrier alignment check patterns formed on the barrier of the landscape mode of the two-view 3D display according to Embodiment 4 of the disclosure. The same components of Embodiments 4 and 2 retain the same indication numbers.

Figure 11A:
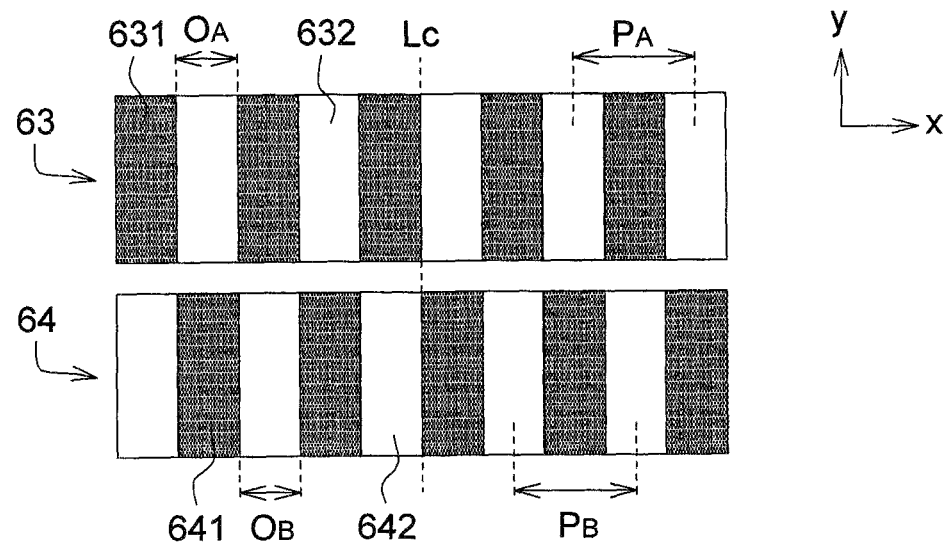
FIG. 11A is a partially enlarging view of the landscape display alignment check pattern on the display panel of FIG. 10A.
Figure 11B:
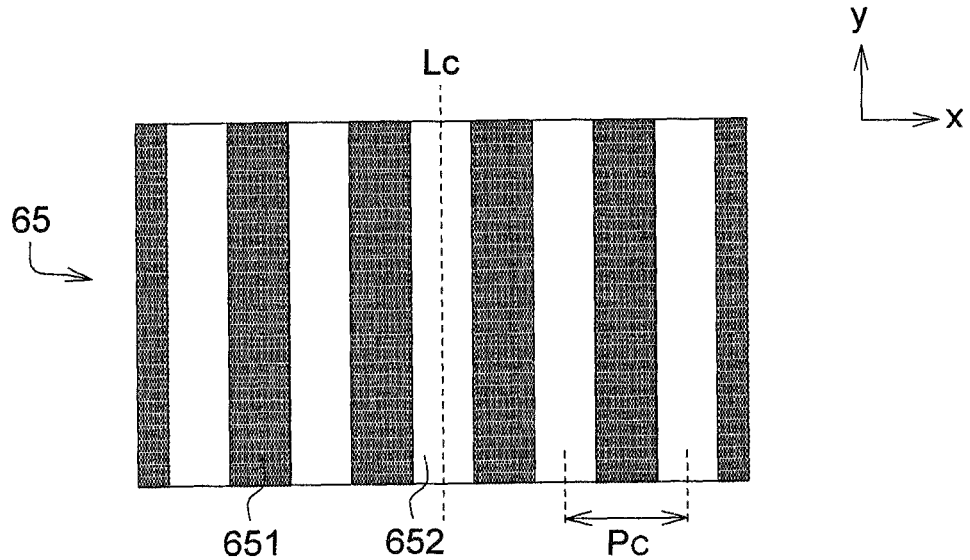
FIG. 11B illustrates is a partially enlarging view of the landscape barrier alignment check pattern on the barrier of FIG. 10B.

Similar to Embodiment 2, the landscape display alignment check pattern is located outside the active area (AA), such as the border area at a longer side of a color filter of display panel 61. The landscape barrier alignment check pattern is located at the barrier 62 and positioned correspondingly to the landscape display alignment check pattern. The landscape display alignment check pattern includes a first set 63 of several opaque vertical stripes 631 interlaced with several transmissive vertical stripes 632, and a second set 64 of several opaque vertical stripes 641 interlaced with several transmissive vertical stripes 642. The landscape barrier alignment check pattern includes a third set 65 of several opaque vertical stripes 651 interlaced with several transmissive vertical stripes 652 formed at a longer side of the barrier 62. FIG. 11A is a partially enlarging view of the landscape display alignment check pattern on the display panel of FIG. 10A. FIG. 11B illustrates is a partially enlarging view of the landscape barrier alignment check pattern on the barrier of FIG. 10B. In Embodiment 4, aperture of the first set 63, $O_A$, is identical to aperture of the second set 64, $O_B$. Also, the second set 64 is a horizontal mirror pattern of the first set 63 from a virtual vertical center line $L_C$ of the display panel 61, while a middle position of the transmissive stripe 652 of the third set 65 is aligned with the virtual vertical center line $L_C$. Also, the stripe pitch $P_A$ of the first set 63, the stripe pitch $P_B$ of the second set 64 and the stripe pitch $P_C$ of the third set 65 are substantially identical. Other details of landscape display and barrier alignment check patterns are the same as the descriptions of FIG. 7A and FIG. 7B of Embodiment 2, and not repeatedly illustrated here.

Figure 11C:
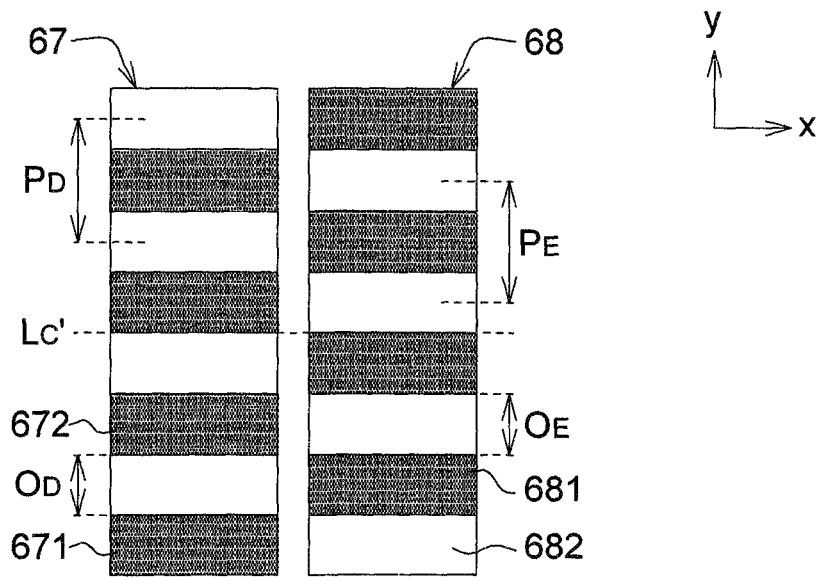
FIG. 11C is a partially enlarging view of the portrait display alignment check pattern on the display panel of FIG. 10A.
Figure 11D:
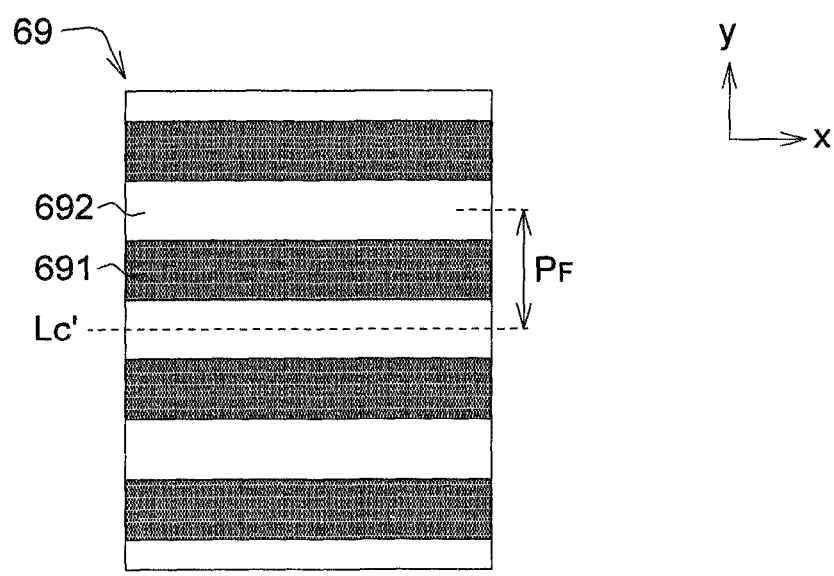
FIG. 11D illustrates is a partially enlarging view of the portrait barrier alignment check pattern on the barrier of FIG. 10B.

Similarly, the portrait display alignment check pattern includes a fourth set 67 of several opaque horizontal stripes 671 interlaced with several transmissive horizontal stripes 672, and a fifth set 68 of several opaque horizontal stripes 681 interlaced with several transmissive horizontal stripes 682. The portrait barrier alignment check pattern includes a sixth set 69 of several opaque horizontal stripes 691 interlaced with several transmissive horizontal stripes 692 formed at a shorter side of the barrier 62. FIG. 11C is a partially enlarging view of the portrait display alignment check pattern on the display panel of FIG. 10A. FIG. 11D illustrates is a partially enlarging view of the portrait barrier alignment check pattern on the barrier of FIG. 10B. In Embodiment 4, those opaque and transmissive stripes of the fourth set 67, the fifth set 68 and the sixth set 69 are horizontal to the x-direction. Also, the length along the x-direction of sixth set 69 covers the x-direction extent of the fourth set 67 and the fifth set 68 (i.e the sum of the horizontal lengths of the fourth and fifth sets and the space therebetween). The vertical lengths along the y-direction of the fourth set 67, the fifth set 68 and the sixth set 69 are substantially identical. Also, aperture of the fourth set 67, $O_D$, is identical to aperture of the fifth set 68, $O_E$. Also, the fifth set 68 is a horizontal mirror pattern of the fourth set 67 from a virtual horizontal center line $L_C'$ of the display panel 61, while a middle position of the transmissive stripe 692 of the sixth set 69 is aligned with the horizontal center line $L_C'$. Also, the stripe pitch $P_D$ of the fourth set 67, the stripe pitch $P_E$ of the fifth set 68 and the stripe pitch $P_F$ of the sixth set 69 are substantially identical. Other details of portrait display and barrier alignment check patterns are similar to the descriptions of landscape display and barrier alignment check patterns, which are not repeatedly illustrated here. Moreover, the 3D image based alignment method of Embodiment 4 is very similar to that of Embodiment 3. Please refer to FIG. 9 for acquiring one of the 3D image based alignment methods of Embodiment 4.

<Embodiment 5>

In Embodiments 2 and 4, the alignment check patterns are fabricated at the outsides of active screen areas. In Embodiments 1 and 3, the alignment check patterns are presented by inputting images, including Right pixel ON band and Left pixel ON band at the same time for one set. In Embodiments 1-4, the alignment check patterns are all presented at the same time. However, the disclosure is not limited thereto. The 3D image based alignment methods of the disclosure will be also available by the time sequential switching displaying of alignment check patterns on screen areas of the display (such as LCD) and the barrier by simple electrical control, as demonstrate in Embodiment 5.

Figure 12A:
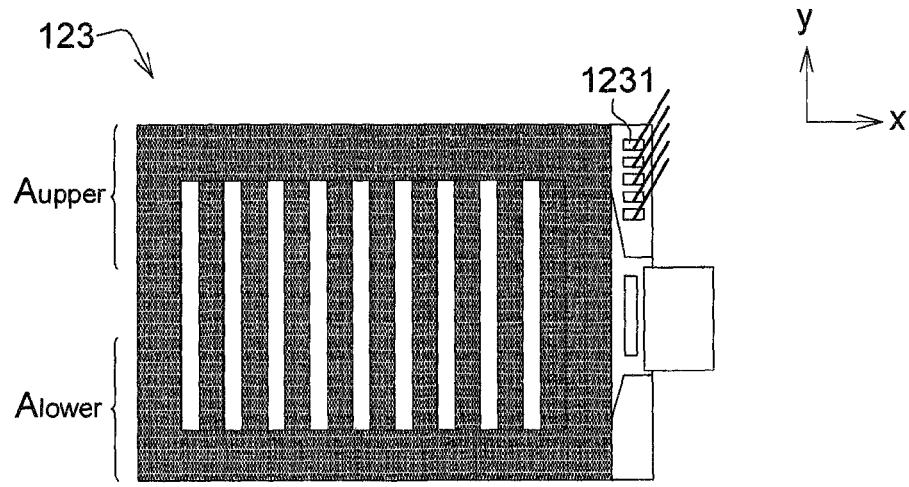
FIG. 12A illustrates a display alignment check pattern of a frame on the display panel of a two-view 3D display according to Embodiment 5 of the disclosure.
Figure 12B:
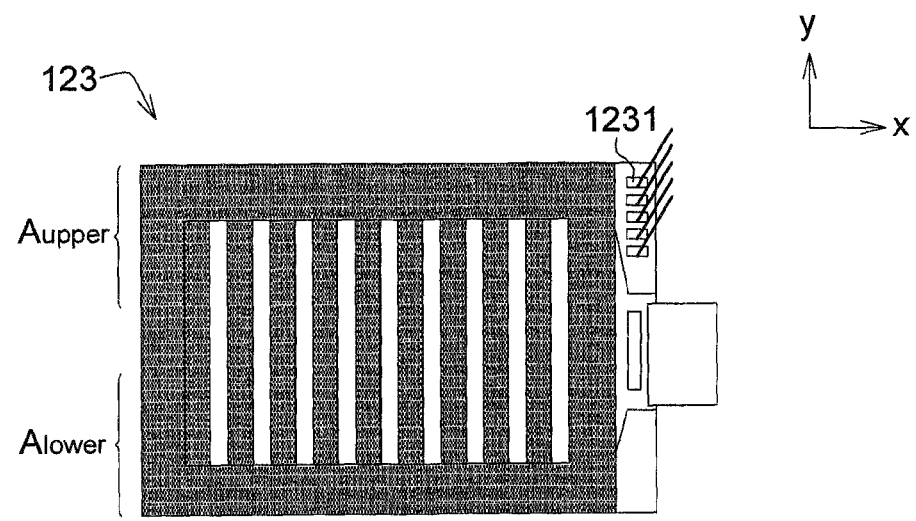
FIG. 12B illustrates a display alignment check pattern of next frame on the display panel of a two-view 3D display according to Embodiment 5 of the disclosure.

Please refer to FIG. 12A and FIG. 12B. FIG. 12A illustrates a display alignment check pattern of a frame on the display panel of a two-view 3D display according to Embodiment 5 of the disclosure. FIG. 12B illustrates a display alignment check pattern of next frame on the display panel of a two-view 3D display according to Embodiment 5 of the disclosure. In Embodiment 5, a frame shows R pixel ON band on the display panel 123 as depicted in FIG. 12A, and next frame sequentially shows L pixel ON band on the display panel 123 as depicted in FIG. 12B. The barrier cell is always turned on with its own barrier alignment check pattern during time sequential switching displaying of alignment check patterns on the display panel 123.

The 3D image based alignment method of Embodiment 5, such as image capture of a moiré pattern generated by the time-sequential switching alignment check patterns and the barrier alignment check pattern, determination of measurement points and calculation of corresponding position shift ($\Delta x/\Delta y$), rotation angle ($\phi$) and/or optical gap ($d_{air}$, along the z-axis) by the alignment shift analysis software, adjustment if calculation results exceed predetermined alignment errors, etc. are similar to the embodiments above, and those details are not redundantly described herein.

The 3D image based alignment methods of Embodiment 5 is more efficient in real lamination/inspection equipment because the check pattern is controlled by simple voltage input from "provide pad" 1231, not from the real video control connector. Also, this special display pattern, as shown in FIG. 12A and FIG. 12B, can be controlled by circuits of SOP (System-on-Panel) applications of LTPS (low temperature poly-silicon).

<Embodiment 6>

Figure 13A:
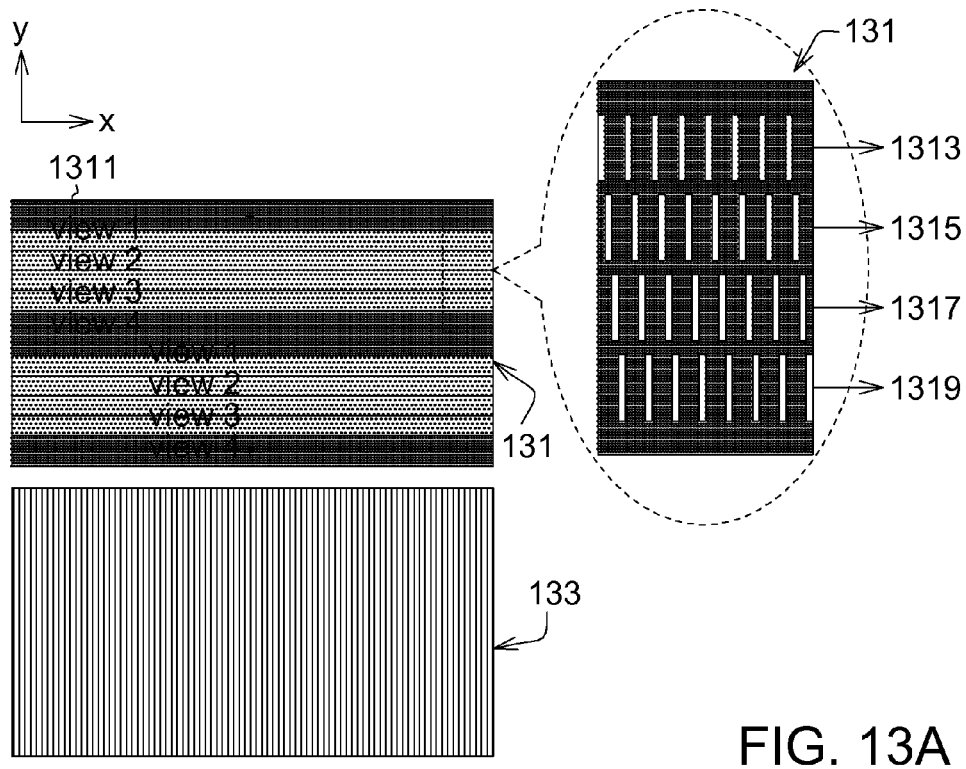
FIG. 13A illustrates one combination of alignment check patterns on the display panel and the barrier of a four-view 3D display according to Embodiment 6 of the disclosure.

The 3D image based alignment methods of the disclosure are not limited to the two-view 3D display applications, and the multi-view 3D displays are also applicable. A four-view 3D display is taken for illustrating a multi-view 3D display application herein. FIG. 13A illustrates one combination of alignment check patterns on the display panel and the barrier of a four-view 3D display according to Embodiment 6 of the disclosure. Multi-view 3D display is a system providing viewing freedom by generating multiple simultaneous viewing windows of which an observer sees just two at any time. Multi-view 3D display shows multiple images simultaneously and a single viewer sees any two of them at any time Multi-view 3D display can also support more than one observer if enough horizontal viewing freedom is available.

As shown in FIG. 13A, a display alignment check pattern 131 presented on the display panel 33 includes several interlaced horizontal stripes 1311 (ex: parallel to x-direction) with a characteristic order of grey scales. In Embodiment 6, those interlaced horizontal stripes 1311 include the view-1, view-2, view-3 and view-4 stripes. The enlarged portion of display alignment check pattern 131 is also shown in FIG. 13A, which could be divided into four (e.g. n, n=number of viewing zones of the 3D display) parts of stripes, including a first group 1313 of opaque and transmissive interlaced vertical stripes to allow showing the view-1 pixels on image only (i.e. showing image for view -1 zone only), a second group 1315 of opaque and transmissive interlaced vertical stripes to allow showing the view-2 pixels on image only, a third group 1317 of opaque and transmissive interlaced vertical stripes to allow showing the view-3 pixels on image only, and a fourth group 1319 of opaque and transmissive interlaced vertical stripes to allow showing the view-4 pixels on image only. Those vertical stripes (of groups 1313, 1315, 1317 and 1319) are extended along the y-direction. In FIG. 13A, merely a small part of the display alignment check pattern 131 is depicted, and several first groups 1313, second groups 1315, third groups 1317 and fourth groups 1319 are interfaced with each other to form a whole display alignment check pattern of Embodiment 6. A barrier alignment check pattern 133 presented on the barrier module 34 and corresponding to the display alignment check pattern 131 is also shown in FIG. 13A, which is a slit pattern or an image pattern with alternative black and white (i.e. opaque and transmissive) stripes.

Similarly, the display alignment check pattern 131 and the barrier alignment check pattern 133 could be presented by inputting a LCD interlaced image on the display panel 33 and inputting a barrier image on the barrier module 34. Also, the barrier alignment check pattern 133 could be just a fixed barrier pattern formed on the barrier. The disclosure has no limitation to the way for presenting corresponding images.

Figure 13B:
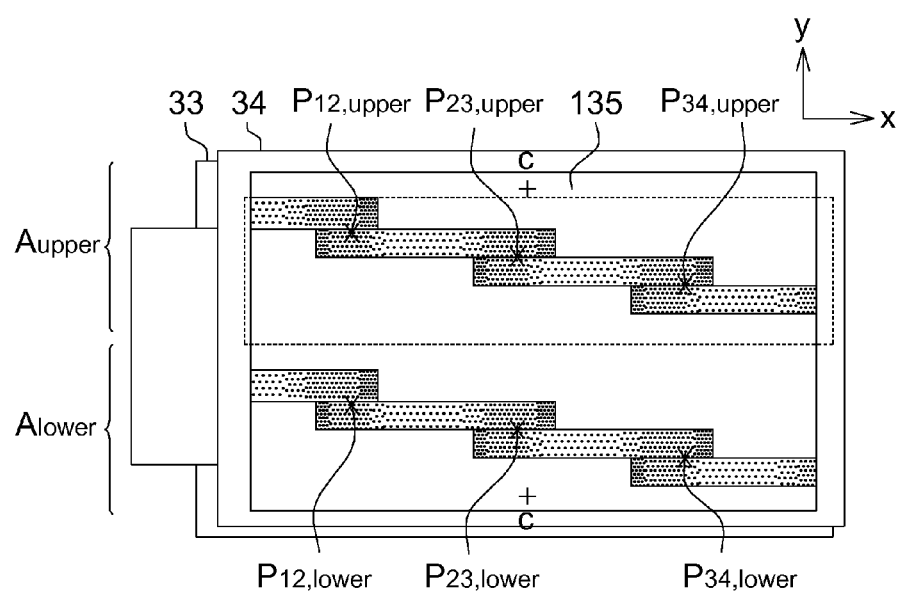
FIG. 13B shows a moiré pattern generated by the display alignment check pattern and the barrier alignment check pattern of FIG. 13A.

FIG. 13B shows a moiré pattern generated by the display alignment check pattern and the barrier alignment check pattern of FIG. 13A. After the display alignment check pattern 131 and the barrier alignment check pattern 133 are shown (by image inputting or directly marking) on the display panel 33 and on the barrier module 34, the image capture tool 36 captures an image of a moiré pattern 135 generated by the display alignment check pattern 131 and the barrier alignment check pattern 133 above. The image of moiré pattern 135 is analyzed by the alignment shift analysis software 35, to determine at least three measurement points correspondingly at an upper area ($A_{upper}$) and a lower area ($A_{lower}$) of the image of the moiré pattern 135. As shown in FIG. 13B of Embodiment 6, six measurement points are obtained for determining for position shit and rotation angle, including points $P_{12,upper}$, $P_{23,upper}$ and $P_{34,upper}$ at the upper area ($A_{upper}$), and $P_{12,lower}$, $P_{23,lower}$ and $P_{34,lower}$ at the lower area ($A_{lower}$). Then, a x-position shift ($\Delta x$) for each of the measurement points is calculated by the alignment shift analysis software 35.

Figure 13C:
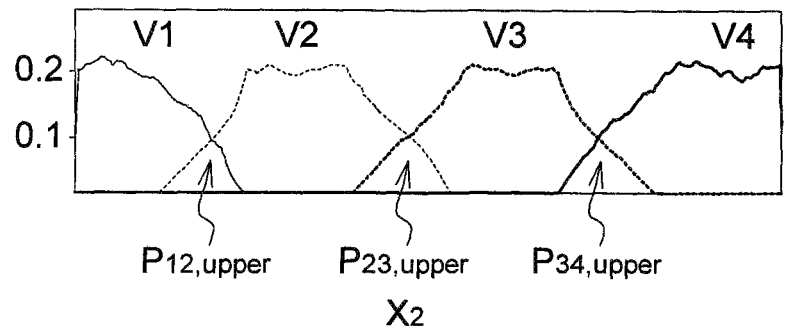
FIG. 13C illustrates the intensity data extract versus position of the image of the moiré pattern of FIG. 13B analyzed by the alignment shift analysis software.

FIG. 13C illustrates the intensity data extract versus position of the image of the moiré pattern of FIG. 13B analyzed by the alignment shift analysis software. In the embodiment, the image of the moiré pattern 135 analyzed by the alignment shift analysis software 35 comprises step of plotting extracted brightness intensity data versus position of the image of the moiré pattern 135, and v1, v2, v3 and v4 curves are shown as in FIG. 13C. The v1, v2, v3 and v4 curves represent the eye brightness intensity received by the eye varied with the x-position at the view-1, view-2, view-3 and view-4 viewing zones, respectively. The measurement point $P_{12,upper}$ is determined by finding the crossing point of v1 and v2 curves at the upper area $A_{upper}$, and point $P_{12,upper}$ has the same brightness of the view-1 and view-2 zones. Similarly, the measurement point $P_{23,upper}$ is determined by finding the crossing point of v2 and v3 curves, and point $P_{23,upper}$ has the same brightness of the view-2 and view-3 zones. Similarly, the measurement point $P_{34,upper}$ is determined by finding the crossing point of v3 and v4 curves at the upper area $A_{upper}$, and point $P_{34,upper}$ has the same brightness of the view-3 and view-4 zones.

Figure 13D:
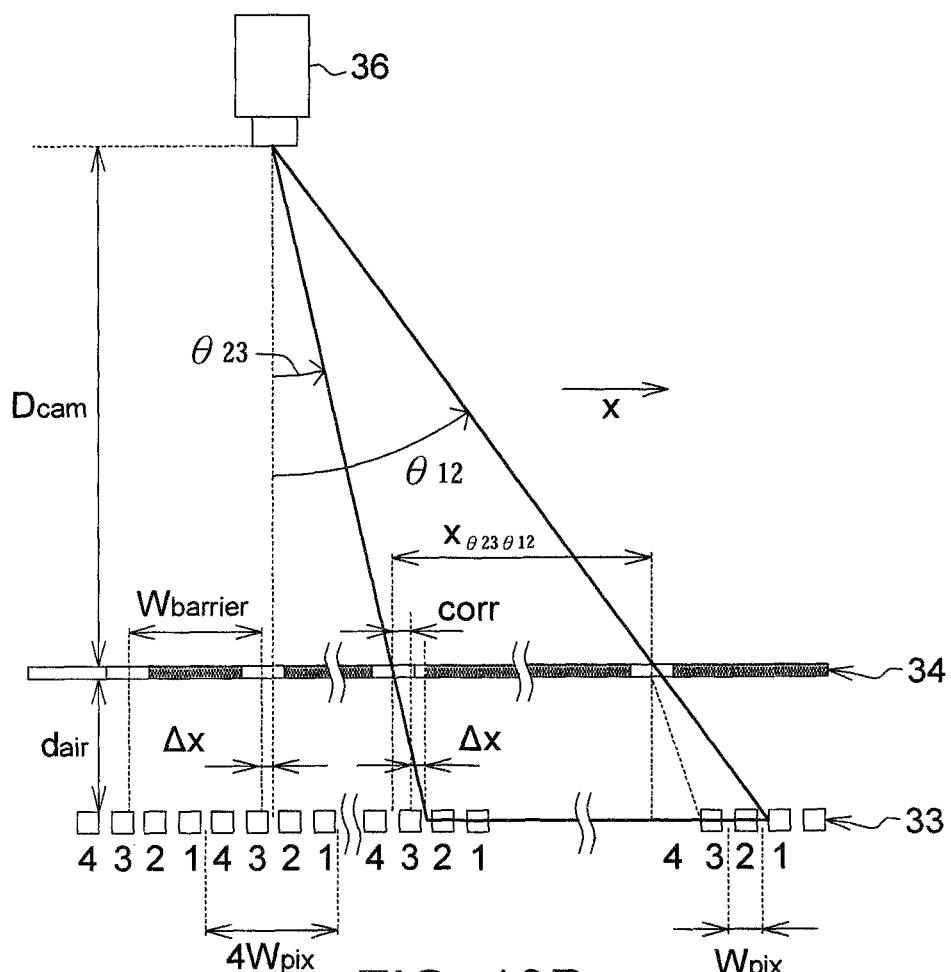
FIG. 13D is a simple drawing of the image capture tool, the barrier and view-1 to view-4 pixels of the display panel beneath the barrier according to the Embodiment 6 of the disclosure.

FIG. 13D is a simple drawing of the image capture tool, the barrier and view-1 to view-4 pixels of the display panel beneath the barrier according to the Embodiment 6 of the disclosure. The following description represents the calculation formulas for 3D image based alignment method of the embodiment 6. The calculation formulas for two-view 3D display and four-view 3D display are similar, except a factor "2" (i.e. $2 \cdot W_{pix}$) or "4" (i.e. $4 \cdot W_{pix}$) adopted in the formulas. Therefore, those equations could be applied to any 3D display with different number of viewing zones. Please also refer FIG. 13D for the related parameters of the calculation formulas. Two measurement points, such as $P_{12,upper}$ and $P_{23,upper}$ are taken for illustration, and calculations of an x-position shift ($\Delta x$), and an optical distance ($d_{air}$) of measurement points between corresponding pixel of the display panel 33 and the barrier module 34 in air are represented as below.

$$\Delta x_{23} = -d_{air} \times \tan\theta_{23} + D_{cam} \cdot \tan\theta_{23} \cdot \left(\frac{4 \cdot W_{pix}}{W_{barrier}} - 1\right) \quad (6)$$

In equation (6), $D_{cam} \cdot \tan\theta_{23} \cdot \left(\frac{4 \cdot W_{pix}}{W_{barrier}} - 1\right)$ is added for view point correction.

$$\frac{x_{\theta 23 \theta 12} \frac{4 \cdot W_{pix}}{W_{barrier}} + W_{pix}}{x_{\theta 23 \theta 12}} = \frac{D_{cam} + d_{air}}{D_{cam}} \quad (7)$$

$$x_{\theta 23 \theta 12} = D_{cam} \cdot |\tan\theta_{12} - \tan\theta_{23}| \quad (8)$$

From equations (6), (7) and (8), $\quad (9)$ $$d_{air} = \frac{W_{pix}}{|\tan\theta_{12} - \tan\theta_{23}|} + D_{cam} \cdot \left(\frac{4 \cdot W_{pix}}{W_{barrier}} - 1\right)$$

$$\Delta x_{23} = \frac{-W_{pix} \cdot \tan\theta_{23}}{|\tan\theta_{12} - \tan\theta_{23}|} \quad (10)$$

where $\theta_{23}$ is an angle from the image capture tool 36 to borders of view-2 pixel and view-3 pixel, $\theta_{12}$ is an angle from the image capture tool 36 to borders of view-1 pixel and view-2 pixel, $\Delta x_{23}$ is a x-position shift (of a barrier center position) from borders of view-2 pixel and view-3 pixel, $d_{air}$ is an optical distance(/gap) between pixels and the barrier module 34 in air, $W_{pix}$ is pixel width, $W_{barrier}$ is barrier width, and $D_{cam}$ is a vertical distance between the image capture tool 36 and the barrier module 34. Those parameters of the equations (6)-(10) have been depicted in FIG. 13D.

As shown in the equation (10) and FIG. 13D, the x-position shift such as $\Delta x_{23}$ can be calculated by two angles such as ($\theta_{12}$, $\theta_{23}$) of two measurement points $P_{12,upper}$ and $P_{23,upper}$. Thus, the calculation of x-position shift ($\Delta x$, at the upper area), x-position shift ($\Delta x$, at the lower area), 3D optical gap ($d_{air}$) and rotation error (degree) can be carried out by the alignment shift analysis software 35 according to the steps and calculation formulas described above.

Similarly, more measurement points calculated, more accurate the alignment between display and barrier. Also, panel center marks C (as "+") in FIG. 13B can be used to get position error. Moreover, although 6 measurement points are demonstrated in Embodiment 6, the disclosure is not limited thereto, and the number of the measurement points could be less than 6, as long as whether x-position shift and rotation occur could be determined. The determination of measurement points of Embodiment 6 are not limited the number and selected positions in FIG. 13B, and could be optionally varied according to the requirements of practical application. The 3D image based alignment method according to Embodiment 6, such as image capture of a moiré pattern 135 generated by the display alignment check pattern 131 and the barrier alignment check pattern 133, determination of measurement points and calculation of corresponding position shift ($\Delta x$), rotation angle ($\phi$) and/or optical gap ($d_{air}$ along the z-axis) by the alignment shift analysis software 35, adjustment if calculation results exceed predetermined alignment errors, etc. are similar to that of Embodiment 1 (please refer to FIG. 5), and those details are not redundantly described herein.

<Embodiment 7>

Figure 14A:
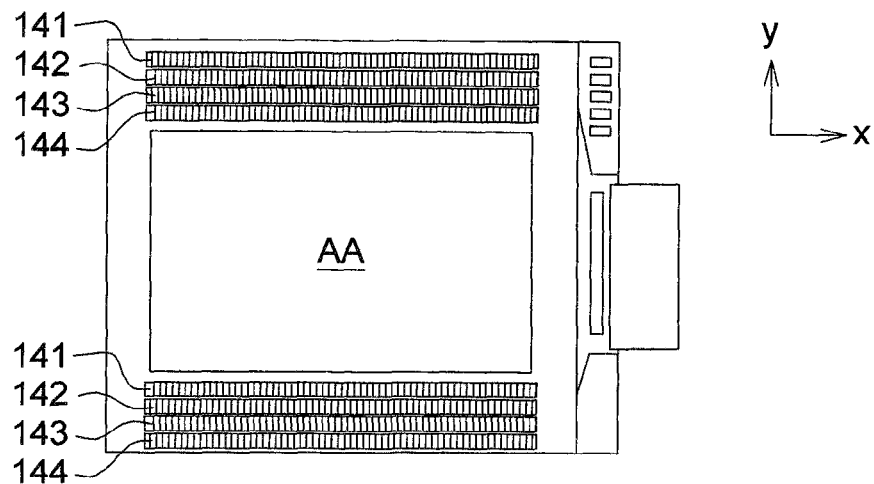
FIG. 14A illustrates a display alignment check pattern formed on the display panel of a four-view 3D display according to Embodiment 7 of the disclosure.
Figure 14B:
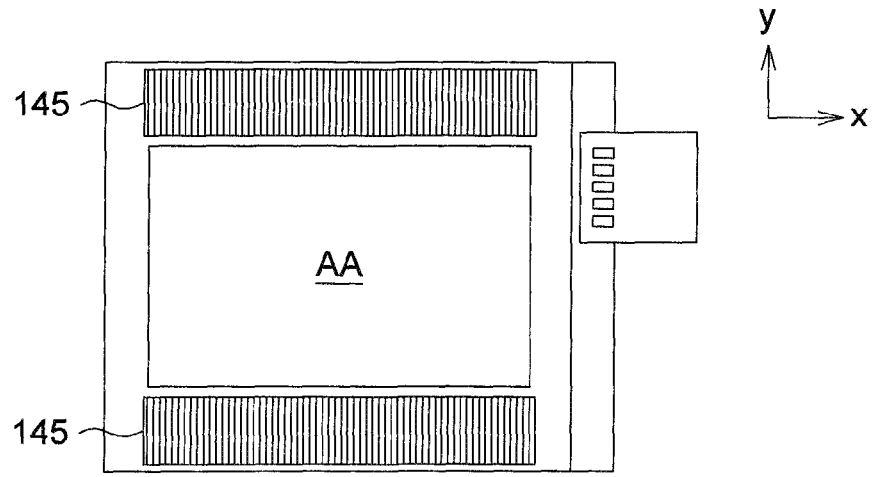
FIG. 14B illustrates a barrier alignment check pattern formed on the barrier of the four-view 3D display according to Embodiment 7 of the disclosure.

Please refer to FIG. 14A and FIG. 14B. FIG. 14A illustrates a display alignment check pattern formed on the display panel of a four-view 3D display according to Embodiment 7 of the disclosure. FIG. 14B illustrates a barrier alignment check pattern formed on the barrier of the four-view 3D display according to Embodiment 7 of the disclosure. Alignment check patterns of Embodiment 7 are arranged in the similar way to Embodiment 2 and Embodiment 4, and this is useful for "narrow optical gap" design and/or "multi-view 3D".

In Embodiment 7, those 3D corresponding alignment check patterns are fixed patterns, and the display image control unit 385 (FIG. 3) for display panel 14-1 and the barrier voltage control unit 387 (FIG. 3) for barrier 14-2 are no need. The display alignment check pattern can be fabricated outside the active area (AA), such as at a border area of a color filter of display panel 14-1. The barrier alignment check pattern is located at the barrier 14-2 (e.g. 3D component, such as 3D barrier cell or 3D LC lens cell) and corresponding to the display alignment check pattern of the display panel 14-1. Also, the display alignment check pattern includes a first set 141, a second set 142, a third set 143 and a fourth set 144 of opaque and transmissive interlaced vertical stripes formed at a longer side of the upper part of the display panel 14-1, as shown in FIG. 14A. Also, another identical group of the first set 141, the second set 142, the third set 143 and the fourth set 144 is formed at the lower part of the border area of the display panel 14-1. The barrier alignment check pattern includes two of the fifth sets 145, each having opaque and transmissive interlaced vertical stripes, formed at a longer side of the upper part and lower part of the barrier 14-2. In Embodiment 7, those opaque and transmissive stripes of the first set 141 to the fifth set 145 are vertical to the x-direction. Also, the length along the y-direction of the fifth set 145 covers the vertical extent of the first set 141 to the fourth set 144 (i.e. the sum of the longitudinal lengths of the first set 141 to the fourth set 144 and the spaces therebetween). The lateral lengths along the x-direction of the first set 141 to the fifth set 145 are substantially identical.

Figure 15A:
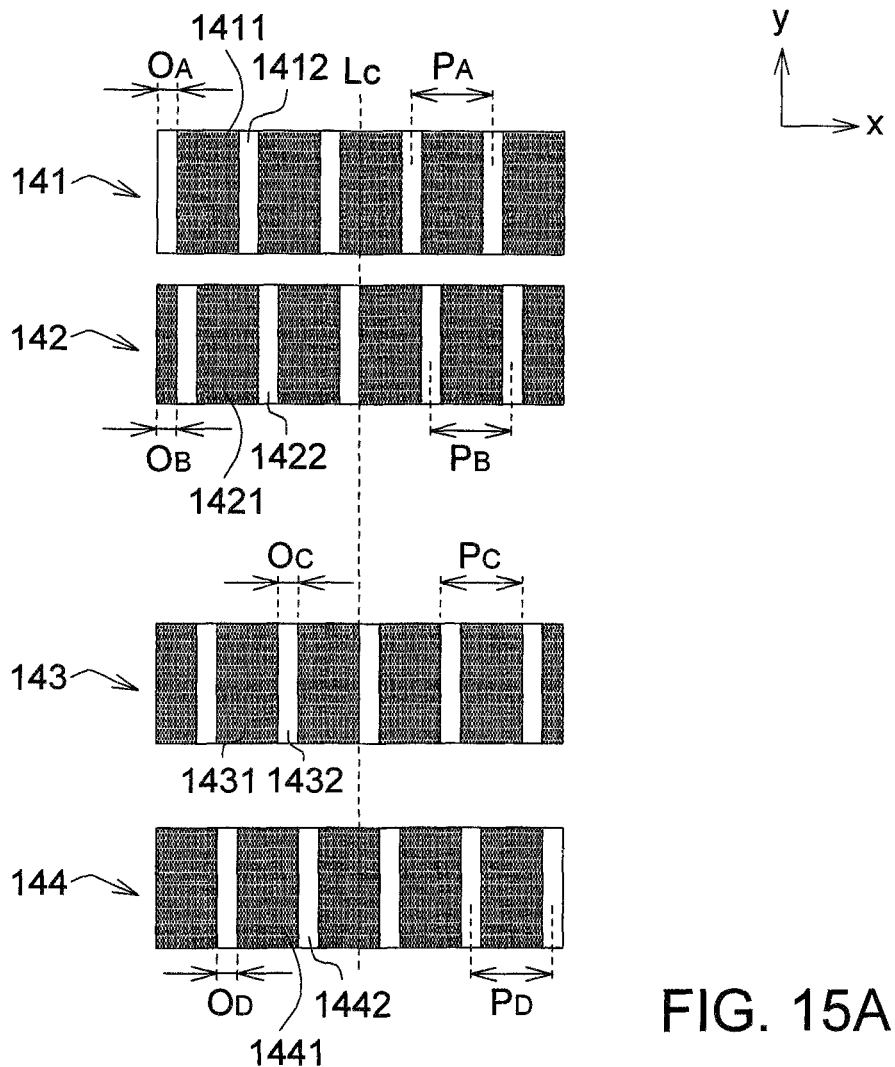
FIG. 15A is a partially enlarging view of the display alignment check pattern on the display panel of FIG. 14A.
Figure 15B:
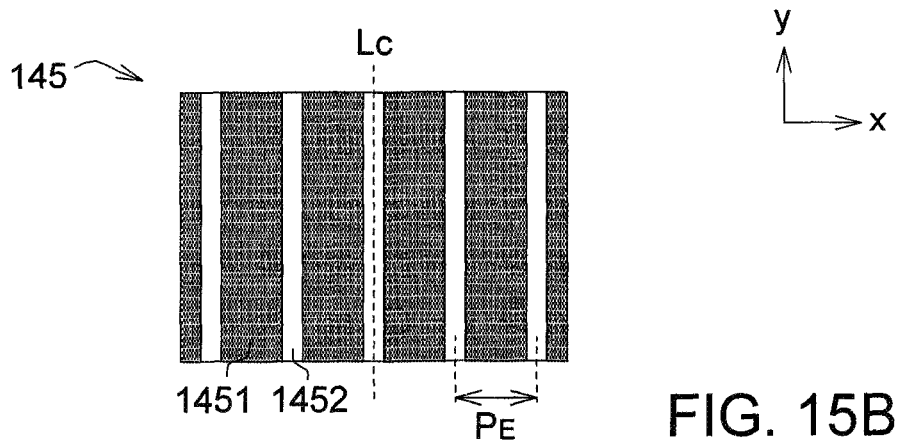
FIG. 15B illustrates is a partially enlarging view of the barrier alignment check pattern on the barrier of FIG. 14B.

FIG. 15A is a partially enlarging view of the display alignment check pattern on the display panel of FIG. 14A. FIG. 15B illustrates is a partially enlarging view of the barrier alignment check pattern on the barrier of FIG. 14B. As shown in FIG. 15A, each of the first, second, third and fourth sets 141, 142, 143 and 144 includes several opaque vertical stripes 1411, 1421, 1431 and 1441 interlaced with several transmissive vertical stripes 1412, 1422, 1432 and 1442, respectively. As shown in the FIG. 15A, the transmissive vertical stripes 1412, 1422, 1432 and 1442 of four sets are arranged in a staggered way. Each of the second set 142, the third set 143 and the fourth set 144 is a copy pattern of the first set 141 with horizontal position shift. Also, aperture $O_A$ of the first set 141, aperture $O_B$ of the second set 142, aperture $O_C$ of the third set 143, and aperture $O_D$ of the fourth set 144 are identical. As shown in FIG. 15B, the fifth set 145 includes several opaque vertical stripes 1451 interlaced with several transmissive vertical stripes 1452, and a middle position of the transmissive stripe 1452 is aligned with the virtual vertical center line $L_C$. As shown in the FIG. 15A and FIG. 15B, the opaque stripes 1411, 1421, 1431, 1441 and 1451 have identical width, and the transmissive stripes 1412, 14212, 1432, 1442 and 1452 have identical width; thus, the stripe pitch $P_A$ of the first set 141, the stripe pitch $P_B$ of the second set 142, the stripe pitch $P_C$ of the third set 143, the stripe pitch $P_D$ of the fourth set 144 and the stripe pitch $P_C$ of the fifth set 145 are substantially identical. The 3D image based alignment method of Embodiment 7 is similar to that of Embodiment 2, and those details are not redundantly described herein.

<Embodiment 8>

In Embodiment 7, the alignment check patterns are fabricated at outside of active screen area (AA). In Embodiments 6 and 7, the alignment check patterns on the display panel and the barrier are all presented at the same time. However, the disclosure is not limited thereto. The 3D image based alignment methods of the disclosure will be also available by the time sequential switching displaying of alignment check patterns on screen areas of the display (such as LCD) and the barrier by simple electrical control, as demonstrate in Embodiment 8 (and Embodiment 5).

Figure 16A:
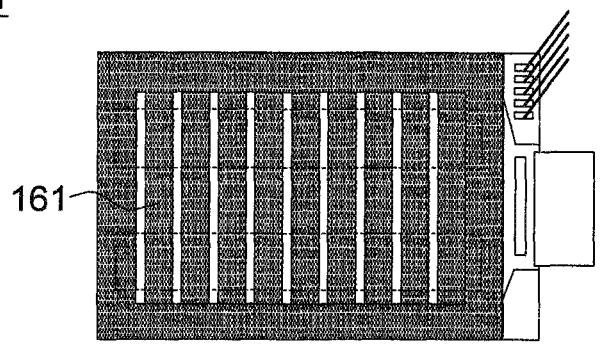
FIG. 16A-FIG. 16D, which illustrate the display alignment check patterns of the first frame, the second frame, the third frame and the fourth frame respectively on the display panel of a four-view 3D display according to Embodiment 8 of the disclosure.
Figure 16B:
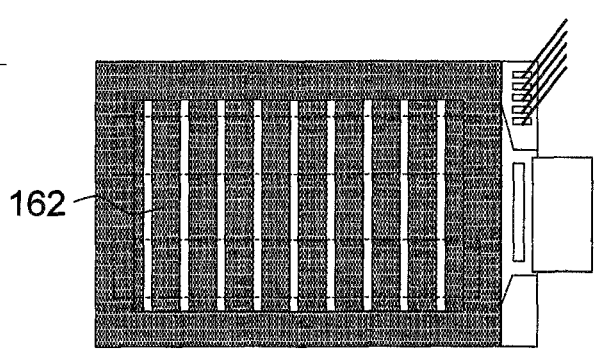
Figure 16C:
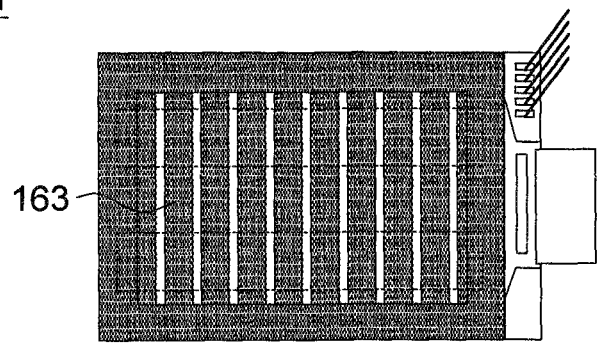
Figure 16D:
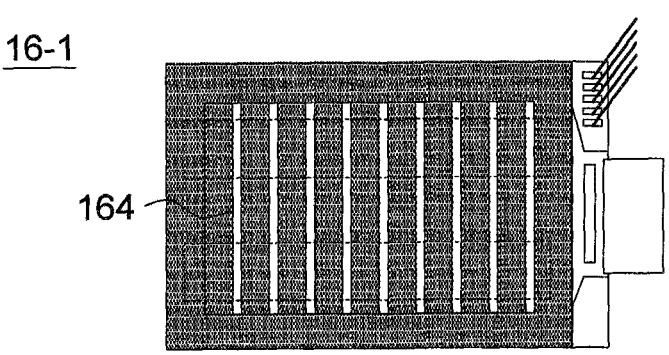

Please refer to FIG. 16A-FIG. 16D, which illustrates the display alignment check patterns of the first frame, the second frame, the third frame and the fourth frame respectively on the display panel of a four-view 3D display according to Embodiment 8 of the disclosure. In Embodiment 8, a first frame shows pattern 1610N band on the display panel 16-1 as depicted in FIG. 16A, the next frame sequentially shows pattern 1620N band on the display panel 16-1 as depicted in FIG. 16B, the third frame sequentially shows pattern 1630N band on the display panel 16-1 as depicted in FIG. 16C, and the fourth frame sequentially shows pattern 1640N band on the display panel 16-1 as depicted in FIG. 16D. The barrier cell is always turned on to show its own stripes of barrier alignment check pattern during time sequential switching displaying of alignment check patterns on the display panel 16-1.

The 3D image based alignment method of Embodiment 8, such as image capture of a moiré pattern generated by the time-sequential switching alignment check patterns and the barrier alignment check pattern, determination of measurement points and calculation of corresponding position shift ($\Delta x/\Delta y$), rotation angle ($\phi$) and/or optical gap ($d_{air}$, along the z-axis) by the alignment shift analysis software, adjustment if calculation results exceed predetermined alignment errors, etc. are similar to the embodiments above, and those details are not redundantly described herein. Also, the 3D image based alignment methods of Embodiment 8 is more efficient in real lamination/inspection equipment because the check pattern is controlled by simple voltage input.

<Embodiment 9>

Figure 17A:
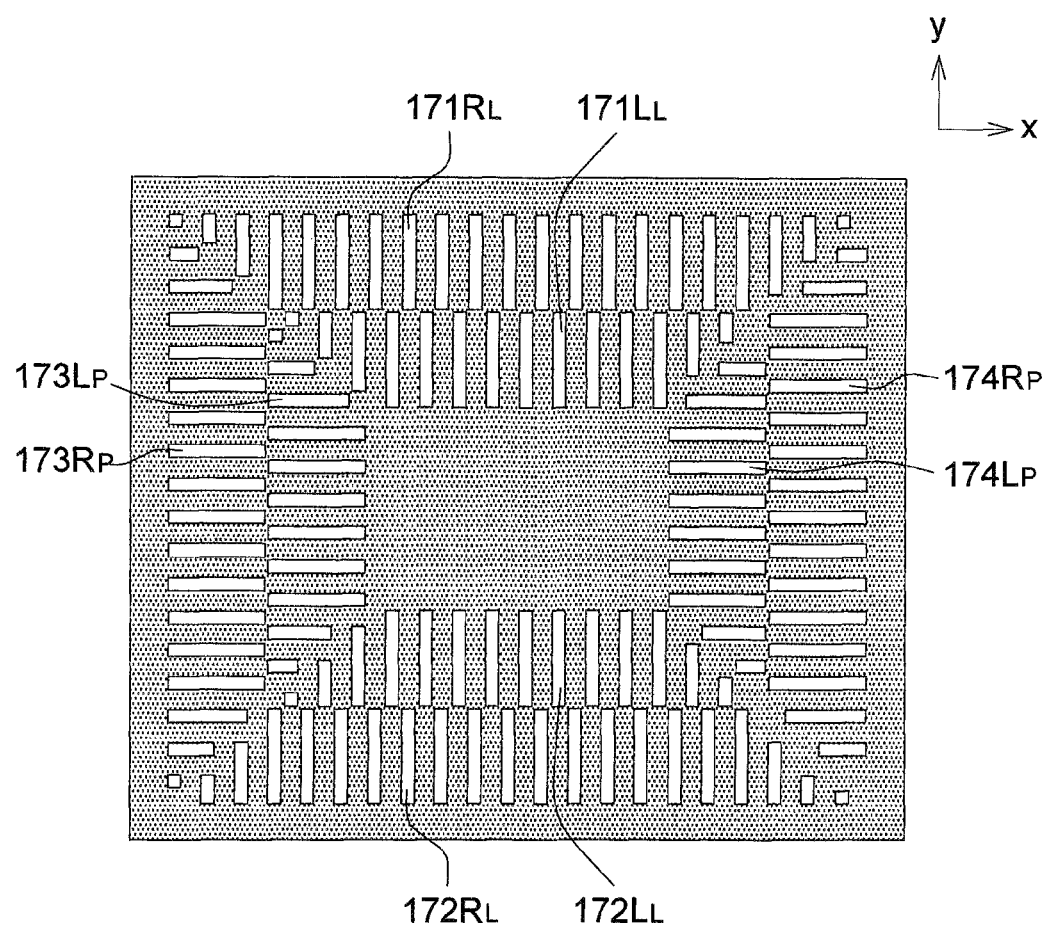
FIG. 17A illustrates a combination of alignment check patterns on the display panel of a two-view 3D display with landscape and portrait modes according to Embodiment 9 of the disclosure.
Figure 17B:
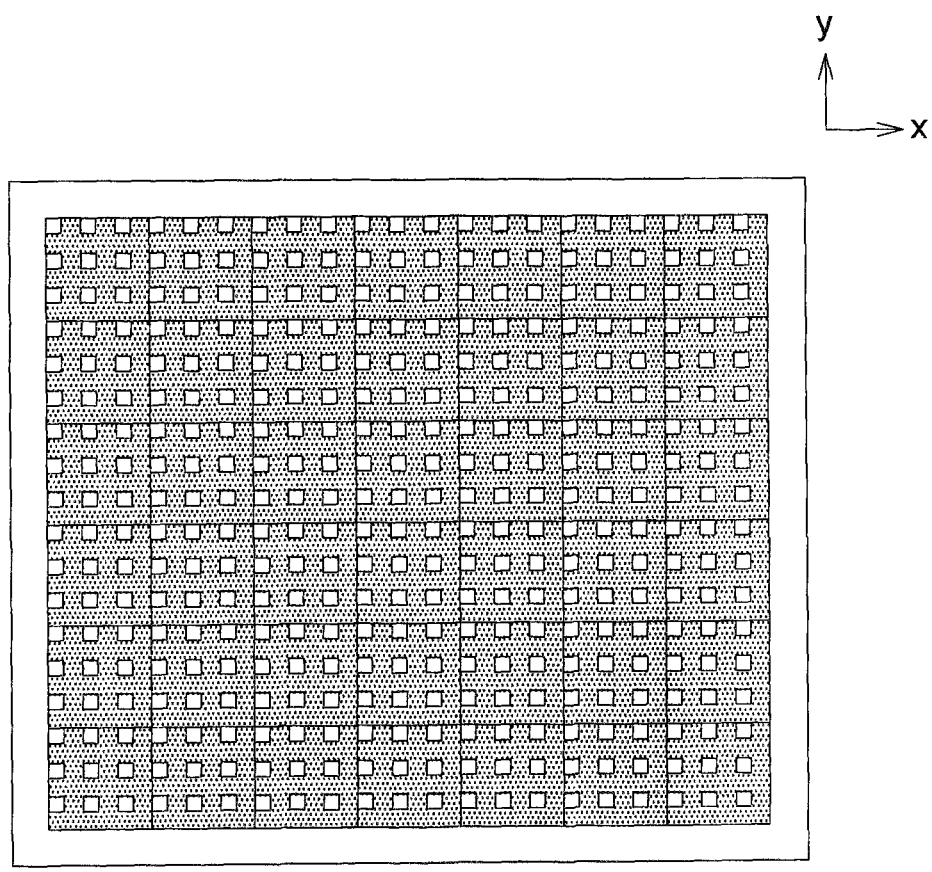
FIG. 17B illustrates a barrier alignment check pattern on the barrier of the two-view 3D display with landscape and portrait modes according to Embodiment 9 of the disclosure.

In Embodiment 9, the display alignment check pattern presented on the display panel comprises a landscape display alignment check pattern and a portrait display alignment check pattern. Thus, the 3D image based alignment method of Embodiment 9 includes one-step check pattern alignment and is applicable for a landscape and portrait modes switchable 3D display. FIG. 17A illustrates a combination of alignment check patterns on the display panel of a two-view 3D display with landscape and portrait modes according to Embodiment 9 of the disclosure. FIG. 17B illustrates a barrier alignment check pattern on the barrier of the two-view 3D display with landscape and portrait modes according to Embodiment 9 of the disclosure. The display alignment check pattern as shown in FIG. 17A is applicable in a two-view 3D display.

As shown in FIG. 17A, a landscape display alignment check pattern includes a first set of a right pixel band of landscape $171R_L$ and a left pixel band of landscape $171L_L$ presented at the upper portion of the display panel, and a second set of a right pixel band of landscape $172R_L$ and a left pixel band of landscape $172L_L$ presented at the lower portion of the display panel. A portrait display alignment check pattern includes a first set of a right pixel band of portrait $173R_P$ and a left pixel band of portrait $173L_P$ presented at the left portion of the display panel, and a second set of a right pixel band of portrait $174R_P$ and a left pixel band of portrait $174L_P$ presented at the right portion of the display panel. In Embodiment 9, one-step check pattern alignment for x-direction and y-direction can be done by the combination of special turn ON barrier alignment check pattern on 3D barrier (as shown in FIG. 17B) and the special alignment check patterns on the display pane (as shown in FIG. 17A).

In Embodiment 3, two-step alignment calculation for landscape mode and portrait mode have been described. With the particular alignment check pattern patterns, the two-step alignment calculation for landscape mode and portrait mode could be integrated as one-step alignment calculation.

Figure 18:
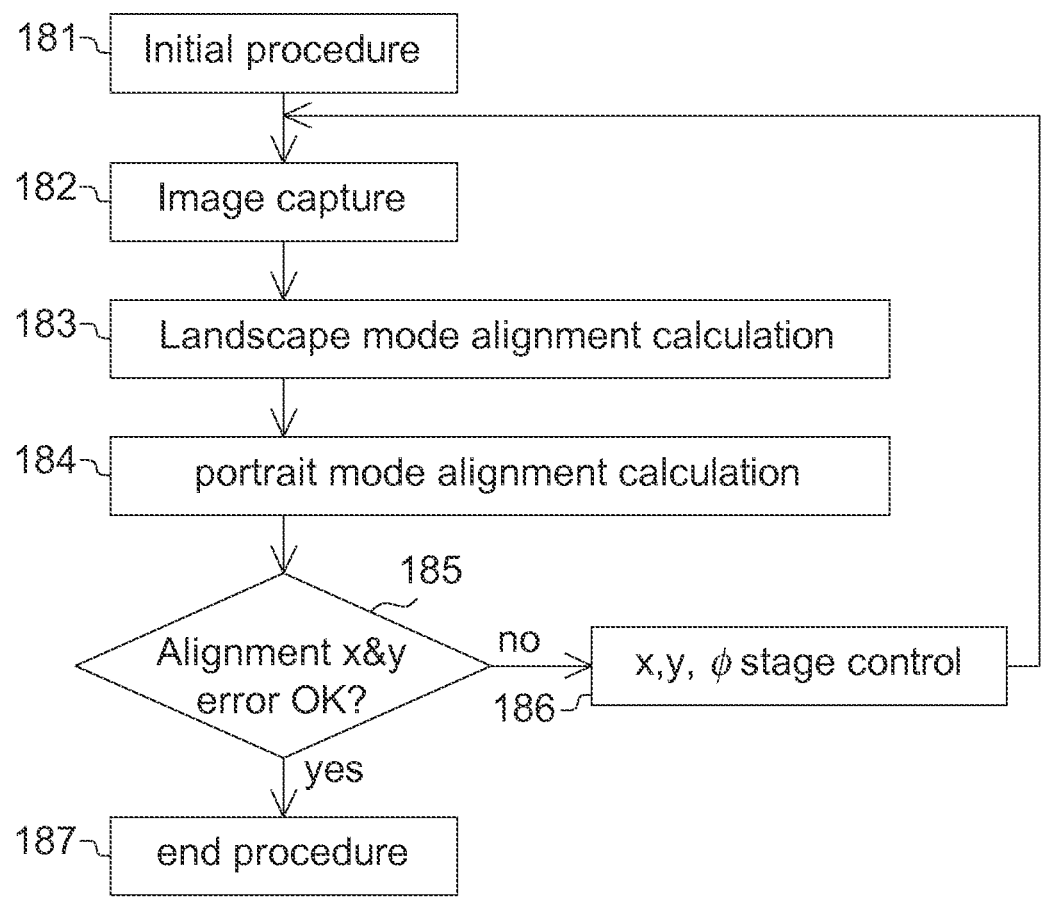
FIG. 18 is a flow chart of a 3D image based alignment method according to Embodiment 9 of the disclosure.

FIG. 18 is a flow chart of a 3D image based alignment method according to Embodiment 9 of the disclosure. In step 181, an initial procedure, such as loading the display (such as LCD) and the 3D barrier samples on the stages, turning the display and the 3D barrier ON, conducting pre-alignment, and inputting the special alignment check patterns (ex: the landscape display alignment check pattern $171R_L+171L_L+172R_L+172L_L$, and the portrait display alignment check pattern $173R_P+173L_P+174R_P+174L_P$) on the display panel and the 3D barrier, is performed. In step 182, an image capture procedure is executed by an image capture tool 36, to capture an image of a moiré pattern generated by the barrier alignment check pattern of FIG. 17B overlying the display alignment check patterns of FIG. 17A. In step 183, calculation of the landscape mode alignment performed by the alignment shift analysis software 35 is executed. In step 184, calculation of the portrait mode alignment performed by the alignment shift analysis software 35 is executed. The details of calculation have been described above, and are not redundantly repeated here.

In step 185, whether the alignments between the display panel and the barrier in the landscape mode and the portrait mode are accurate is determined by checking the calculation results (such as $\Delta x$, or $\Delta y$, $d_{air}$ and rotation angle). If the calculation results exceed the predetermined alignment errors of the landscape mode and the portrait mode, step 186 is executed for adjusting alignment condition between the display panel and the barrier, such as performing the position shift, rotation angle ($\phi$) and/or optical gap ($d_{air}$, along the z-axis) stage control. If the alignment shift analysis software 35 judges the calculation results within the predetermined alignment errors of the landscape mode and the portrait mode, an end procedure (such as display panel turn-off, barrier turn-off, unload display panel and barrier sample) is executed, as indicated in step 187. The calculation and steps of alignment and adjustment of Embodiment 9 are similar to the aforementioned embodiments, and not redundantly described here.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An alignment method, applied to a barrier-type 3D display, comprising:
   providing a 3D alignment device at least comprising an image capture tool and an alignment shift analysis software coupled to the image capture tool;
   disposing a display panel with a barrier laminated thereon in the 3D alignment device, and the image capture tool positioned above the barrier;
   independently and separately presenting a display alignment check pattern on the display panel and a barrier alignment check pattern on the barrier, wherein the display alignment check pattern is different from the barrier alignment check pattern;
   the image capture tool capturing an image of a moiré pattern generated by the barrier alignment check pattern laminating on the display alignment check pattern;
   analyzing the image of the moiré pattern by the alignment shift analysis software, and determining at least three measurement points correspondingly at an upper portion and an lower portion of the image of the moiré pattern;
   calculating a position shift for each of the measurement points by the alignment shift analysis software;
   calculating a rotation angle (at a x-y plane) between the display panel and the barrier from position shift calculation results of the measurement points; and
   adjusting corresponding position between the display panel and the barrier if the position shift results of the measurement points and the rotation angle exceed a predetermined alignment error,
   wherein the image capture tool is positioned correspondingly to a virtual center line of the display panel, and the measurement points are positioned correspondingly to the virtual center line of the display panel, the position shift calculated by the alignment shift analysis software is a x-position shift ($\Delta x$) or a y-position shift ($\Delta y$) for each of the measurement points:

$$\Delta x = \frac{-W_{pix} \cdot \tan\theta_0}{|\tan\theta_1 - \tan\theta_0|}, \Delta y = \frac{-W_{pix} \cdot \tan\theta_0}{|\tan\theta_1 - \tan\theta_0|},$$

where $W_{pix}$ is pixel width of display panel, and two angles ($\theta_0, \theta_1$) are angles of two separate measurement points to the virtual center line.

2. The alignment method according to claim 1, wherein each of the measurement points is a point with the same brightness of different views.

3. The alignment method according to claim 2, wherein the step of analyzing the image of the moiré pattern comprises drawing different view curves by extracting brightness intensity data versus position of the image of the moiré pattern, and the measurement points are determined by finding crossing points of the view curves.

4. The alignment method according to claim 1, wherein when the barrier-type 3D display is a two view 3D display, the display panel comprises plural right (R) pixels and left (L) pixels respectively for right eye view and left eye view, and the display alignment check pattern comprises:
    a first part, having a first group of opaque and transmissive interlaced vertical stripes to allow the right (R) pixels on only; and
    a second part, having a second group of opaque and transmissive interlaced vertical stripes to allow the left (L) pixels on only.

5. The alignment method according to claim 1, wherein when the barrier-type 3D display is a multi-view 3D display with n view (n>2, n is integer), the display panel comprises plural view-1 pixels, view-2 pixels to view-n pixels, and the display alignment check pattern comprises a first group, a second group to a n-th group of opaque and transmissive vertical stripes to respectively allow showing the view 1, view-2 to view-n pixels on image only.

6. The alignment method according to claim 1, wherein the display panel comprises plural pixels, and the alignment method further comprising:
    calculating an optical distance ($d_{air}$) of said each measurement point between corresponding pixel and barrier in air by the alignment shift analysis software.

7. The alignment method according to claim 6, further comprising:
    adjusting an optical gap between the display panel and barrier according to calculation result of the optical distance by a stage control unit coupled to the alignment shift analysis software.

8. The alignment method according to claim 1, wherein the image capture tool is positioned correspondingly to the virtual center line of the display panel, and a first and a second measurement points are positioned correspondingly to the virtual center line of the display panel, and one measurement point is at an upper virtual line while the other at an lower virtual line, and a third measurement point is at the upper virtual line or the lower virtual line by spacing apart from the first measurement point or the second measurement point.

9. The alignment method according to claim 1, wherein the 3D alignment device further comprises:
    a x-y stage, for carrying the display panel;
    a barrier stage, positioned above the x-y stage for holding the barrier, wherein the image capture tool is disposed above the barrier stage; and
    a stage control unit, coupled to the x-y stage and the alignment shift analysis software, to adjust corresponding position between the display panel and the barrier according to the position shift results of the measurement points and the rotation angle.

10. The alignment method according to claim 1, wherein the display alignment check pattern and the barrier alignment check pattern are presented by inputting a display interlaced image on the display panel and inputting a barrier image on the barrier.

11. The alignment method according to claim 1, wherein the 3D alignment device further comprises a barrier voltage control unit coupled to the barrier.

12. The alignment method according to claim 11, wherein a landscape display alignment check pattern and a landscape barrier alignment check pattern are respectively inputted on the display panel and the barrier for proceeding a landscape-mode alignment calculation, while a display interlaced portrait image and a barrier portrait image are respectively inputted on the display pane and the barrier for proceeding a portrait-mode alignment calculation.

13. The alignment method according to claim 1, wherein a display interlaced image is inputted on the display panel to present the display alignment check pattern, while the barrier alignment check pattern is fixed on the barrier.

14. The alignment method according to claim 1, wherein the display alignment check pattern is formed at a border area of the display panel, and the barrier alignment check pattern is formed at the barrier and positioned correspondingly to the display alignment check pattern.

15. An alignment method, applied to a barrier-type 3D display, comprising:
    providing a 3D alignment device at least comprising an image capture tool and an alignment shift analysis software coupled to the image capture tool;
    disposing a display panel with a barrier laminated thereon in the 3D alignment device, and the image capture tool positioned above the barrier;
    independently and separately presenting a display alignment check pattern on the display panel and a barrier alignment check pattern on the barrier, wherein the display alignment check pattern is different from the barrier alignment check pattern;
    the image capture tool capturing an image of a moiré pattern generated by the barrier alignment check pattern laminating on the display alignment check pattern;
    analyzing the image of the moiré pattern by the alignment shift analysis software, and determining at least three measurement points correspondingly at an upper portion and an lower portion of the image of the moiré pattern;
    calculating a position shift for each of the measurement points by the alignment shift analysis software;
    calculating a rotation angle (at a x-y plane) between the display panel and the barrier from position shift calculation results of the measurement points; and
    adjusting corresponding position between the display panel and the barrier if the position shift results of the measurement points and the rotation angle exceed a predetermined alignment error,
    wherein the display alignment check pattern is formed at a border area of the display panel, and the barrier alignment check pattern is formed at the barrier and positioned correspondingly to the display alignment check pattern, and
    wherein when the barrier-type 3D display is a two view 3D display, the display alignment check pattern formed at the border area of the display panel comprises:
    a first set of opaque and transmissive interlaced vertical stripes, and a second set of opaque and transmissive interlaced vertical stripes, and the first and second sets are formed at a longer side of the display panel, the opaque stripes and the transmissive stripes of the first and second sets have identical widths,
    wherein the second set is positioned at one side of the first set, and the second set is a horizontal mirror pattern of the first set from a virtual vertical center line of the display panel, wherein the virtual vertical center line is corresponding to boundaries between the opaque and transmissive stripes of the first set and the second set.

16. The alignment method according to claim 15, wherein the barrier alignment check pattern comprises a third set of opaque and transmissive interlaced vertical stripes, and the opaque stripes and the transmissive stripes of the first, second and third sets have identical widths, wherein a middle position of the transmissive stripe of the third set is corresponding to the virtual vertical center line of the display panel.

17. The alignment method according to claim 16, wherein the display alignment check pattern formed at the border area of the display panel further comprises:
a fourth set of opaque and transmissive interlaced horizontal stripes, and a fifth set of opaque and transmissive interlaced horizontal stripes, and the fourth and fifth sets are formed at a shorter side of the display panel, the opaque stripes and the transmissive stripes of the fourth and fifth sets have identical widths,
wherein the fifth set is positioned at one side of the fourth set, and the fifth set is a vertical mirror pattern of the fourth set from a virtual horizontal center line of the display panel, wherein the virtual horizontal center line is corresponding to boundaries between the opaque and transmissive stripes of the fourth and fifth sets.

18. The alignment method according to claim 17, wherein the barrier alignment check pattern comprises a sixth set of opaque and transmissive interlaced horizontal stripes, and the opaque stripes and the transmissive stripes of the fourth, fifth and sixth sets have identical widths, wherein a middle position of the transmissive stripe of the sixth set is corresponding to the virtual horizontal center line of the display panel.

19. The alignment method according to claim 1, wherein the display alignment check pattern is time-sequential switching displayed on the display panel, while the barrier alignment check pattern is continuously shown on the barrier.

20. The alignment method according to claim 1, wherein the display alignment check pattern presented on the display panel comprises a landscape display alignment check pattern and a portrait display alignment check pattern, after the image capture tool captures the image of the moiré pattern generated by the display alignment check pattern and the barrier alignment check pattern, a landscape mode alignment calculation and a portrait mode alignment calculation are performed by the alignment shift analysis software after analyzing the moiré pattern, thereby obtaining plural results of the x-position shift ($\Delta x$) and the y-position shift ($\Delta y$) of the measurement points.

21. An alignment method, applied to a barrier-type 3D display, comprising:
providing a 3D alignment device at least comprising an image capture tool and an alignment shift analysis software coupled to the image capture tool;
disposing a display panel with a barrier laminated thereon in the 3D alignment device, and the image capture tool positioned above the barrier;
independently and separately presenting a display alignment check pattern on the display panel and a barrier alignment check pattern on the barrier, wherein the display alignment check pattern is different from the barrier alignment check pattern;
the image capture tool capturing an image of a moiré pattern generated by the barrier alignment check pattern laminating on the display alignment check pattern;
analyzing the image of the moiré pattern by the alignment shift analysis software, and determining at least three measurement points correspondingly at an upper portion and an lower portion of the image of the moiré pattern;
calculating a position shift for each of the measurement points by the alignment shift analysis software;
calculating a rotation angle (at a x-y plane) between the display panel and the barrier from position shift calculation results of the measurement points; and
adjusting corresponding position between the display panel and the barrier if the position shift results of the measurement points and the rotation angle exceed a predetermined alignment error, wherein the predetermined alignment error is ±3 μm.

* * * * *